(12) United States Patent
Keiller

(10) Patent No.: US 6,975,993 B1
(45) Date of Patent: Dec. 13, 2005

(54) SYSTEM, A SERVER FOR A SYSTEM AND A MACHINE FOR USE IN A SYSTEM

(75) Inventor: Robert Alexander Keiller, Guildford (GB)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/562,932

(22) Filed: May 2, 2000

(30) Foreign Application Priority Data

May 21, 1999 (GB) .................................... 9911971

(51) Int. Cl.$^7$ ............................................ G10L 15/22
(52) U.S. Cl. ................ 704/275; 704/270.1; 707/104.1; 709/218
(58) Field of Search ............................ 704/270.1, 270, 704/275, 273; 707/104.1; 709/203, 218, 709/219

(56) References Cited

U.S. PATENT DOCUMENTS

| | | | | |
|---|---|---|---|---|
| 5,956,681 A | * | 9/1999 | Yamakita ..................... | 704/260 |
| 5,960,395 A | | 9/1999 | Tzirkel-Hancock .......... | 704/241 |
| 6,366,886 B1 | * | 4/2002 | Dragosh et al. .......... | 704/270.1 |
| 6,642,836 B1 | * | 11/2003 | Wang et al. ................ | 340/3.54 |
| 6,757,655 B1 | * | 6/2004 | Besling et al. ........... | 704/270.1 |

FOREIGN PATENT DOCUMENTS

| | | |
|---|---|---|
| EP | 0 854 418 | 7/1998 |
| EP | 0872 827 | 10/1998 |
| EP | 0 911 808 | 4/1999 |
| WO | WO 99/08084 | 2/1999 |
| WO | WO 99/18566 | 4/1999 |

* cited by examiner

Primary Examiner—Abul K. Azad
(74) Attorney, Agent, or Firm—Fitzpatrick, Cella, Harper & Scinto

(57) ABSTRACT

A system has a first machine (9 to 11,12,13,15) couplable to a network (N) and capable of carrying out at least one function, a speech data receiver (26,27) for receiving speech data representing instructions spoken by a user and specifying a function to be carried out by the first machine and a speech data transmitter (27,28) for transmitting the speech data to a speech server (2) couplable to the network (N). The speech server (2) has a speech manager (6) for accessing a speech recognition engine (5) for performing speech recognition on speech data received over the network to produce recognised speech data, an interpreter (7) for processing recognised speech data to derive from the speech data commands for causing the first machine to carry out the function specified in the spoken instructions and a command transmitter (6) for transmitting said commands over the network to the first machine, the first machine having a control command receiver (27,28) for receiving control commands over the network (N) from the speech server (2) and a controller (20,27) responsive to the control commands for causing the function specified by the spoken instructions to be carried out.

71 Claims, 28 Drawing Sheets

| COPY GRAMMAR | |
|---|---|
| COPY | SINGLE-SIDED |
| MAKE COPY | DOUBLE-SIDED |
| MAKE COPIES | REDUCED |
| COPIES | COLOUR |
| REPRODUCE | BLACK & WHITE |
| | COLLATED |
| | A4 |
| | A3 |
| | STAPLED |

FIG. 7

| PRINT GRAMMAR | | |
|---|---|---|
| PRINT | COLOUR | LASER |
| HARD COPY | HIGH RESOLUTION | COLOUR LASER |
| REPRODUCE | PHOTO-QUALITY | INK JET |
| | REDUCED | COLOUR INK JET |
| | BLACK & WHITE | |
| | SAME SIZE | |

FIG. 8

| FAX GRAMMAR | |
|---|---|
| FAX | STORED NAMES |
| SEND | SHORT CODES |
| | COUNTRY CODES |
| | AREA CODES |

FIG. 9

| SHARED WORDS GRAMMAR | | |
|---|---|---|
| YES | BY | PAPER |
| THAT | ONCE | PAGE |
| THIS | TWICE | TEXT |
| PLEASE | NEXT | PICTURE |
| COULD YOU | PAST | IMAGE |
| AND | DOCUMENT | NO |

FIG. 10

| TIME/DATE GRAMMAR | |
|---|---|
| AM | TODAY |
| PM | TOMORROW |
| O'CLOCK | MONDAY....SUNDAY |
| MORNING | JANUARY...DECEMBER |
| AFTERNOON | |
| EVENING | |

FIG. 11

| MACHINE ID | COPIER NO 9 |
|---|---|
| ASSOCIATED GRAMMARS | COPY; SHARED WORDS; TIME/DATE |
| FUNCTIONS | |
| BLACK & WHITE | YES |
| COLOUR | NO |
| DOUBLE-SIDED | YES |
| REDUCED | YES |
| COLLATED | NO |
| A4 | YES |
| A3 | NO |
| STAPLED | NO |

FIG. 13

SYSTEM, A SERVER FOR A SYSTEM AND A MACHINE FOR USE IN A SYSTEM

BACKGROUND OF THE INVENTION

This invention relates to a system in which a number of machines are coupled together, in particular, but not exclusively, this invention relates to an office network system in which items of office equipment such as photocopiers, facsimile machines, printers, personal computers and the like are coupled to a server.

DESCRIPTION OF RELATED ART

In conventional systems such as office equipment network systems, instructions for controlling the operation of a machine connected to the system are either input directly to the machine itself using a control panel of the machine or are supplied via, for example, a personal computer also connected to the network.

The use of automatic speech recognition engines in relation to computer programs or software such as word processing packages and the like is becoming more common. However, the use of such automatic speech recognition engines is generally in the form of specific automatic speech recognition engines at each personal computer on the network trained to the voice of the user of that personal computer.

SUMMARY OF THE INVENTION

It is an aim of the present invention to provide a system, a server for use in a system and a machine for use in such a system wherein a user can control the network, for example a copier or facsimile machine in the case of an office equipment network, using spoken commands.

In one aspect, the present invention provides a system having a server provided with speech recognition means and at least one machine couplable to a network, means for receiving spoken commands from a user, means for transmitting speech data representing the spoken commands to the server wherein the at least one machine has means for receiving from the server commands for controlling operation of that machine.

In an embodiment, the speech server has access to at least one grammar defining rules relating to the type of commands that can be input to a machine or network and words that can be used within those commands. In an embodiment, different grammars are provided for different types of machines so that, for example, in an office environment the server has access to a copy grammar for use with copying machines, a facsimile grammar for use with facsimile machines and a print grammar for use with printers.

In an embodiment, the server also has access to at least one shared grammar common to the grammars for the different types of machines.

In an embodiment, the server has access to a store of voice macros or predefined commands which associate a mnemonic or phrase with a set or series of functions to be carried out by a machine.

In an embodiment, at least one of the server and the machines couplable to the network has access to a look-up service storing information relating to the capability of machines on the network so that, for example, when a user requests from a machine a function that is not available at that machine the user can be provided with information identifying any machines on the network that can carry out the requested function.

In an embodiment, the server has access to a plurality of different automatic speech recognition engines and is arranged to select the most likely interpretation of received speech data on the basis of the results received from each of the automatic speech recognition engines.

In an embodiment, the speech server has means for accessing an automatic speech recognition engine trained to the voice of the person from whom the spoken commands are received.

In an embodiment, speech data representing commands spoken by a user are supplied to the server via a telephone system associated with the network. Preferably, the telephone system comprises a DECT (Digital Enhanced Cordless Telecommunications) system.

BRIEF DESCRIPTION OF THE DRAWINGS

Embodiments of the present invention will now be described, by way of example, with reference to the accompanying drawings, in which:

FIGS. 7 to 11 show lists of words included in different grammars stored in a grammar store shown in FIG. 1;

FIG. 13 shows an example of data stored by a look-up service of the system shown in FIG. 1;

DETAILED DESCRIPTION OF THE PREFERRED EMBODIMENTS

Figure 1:
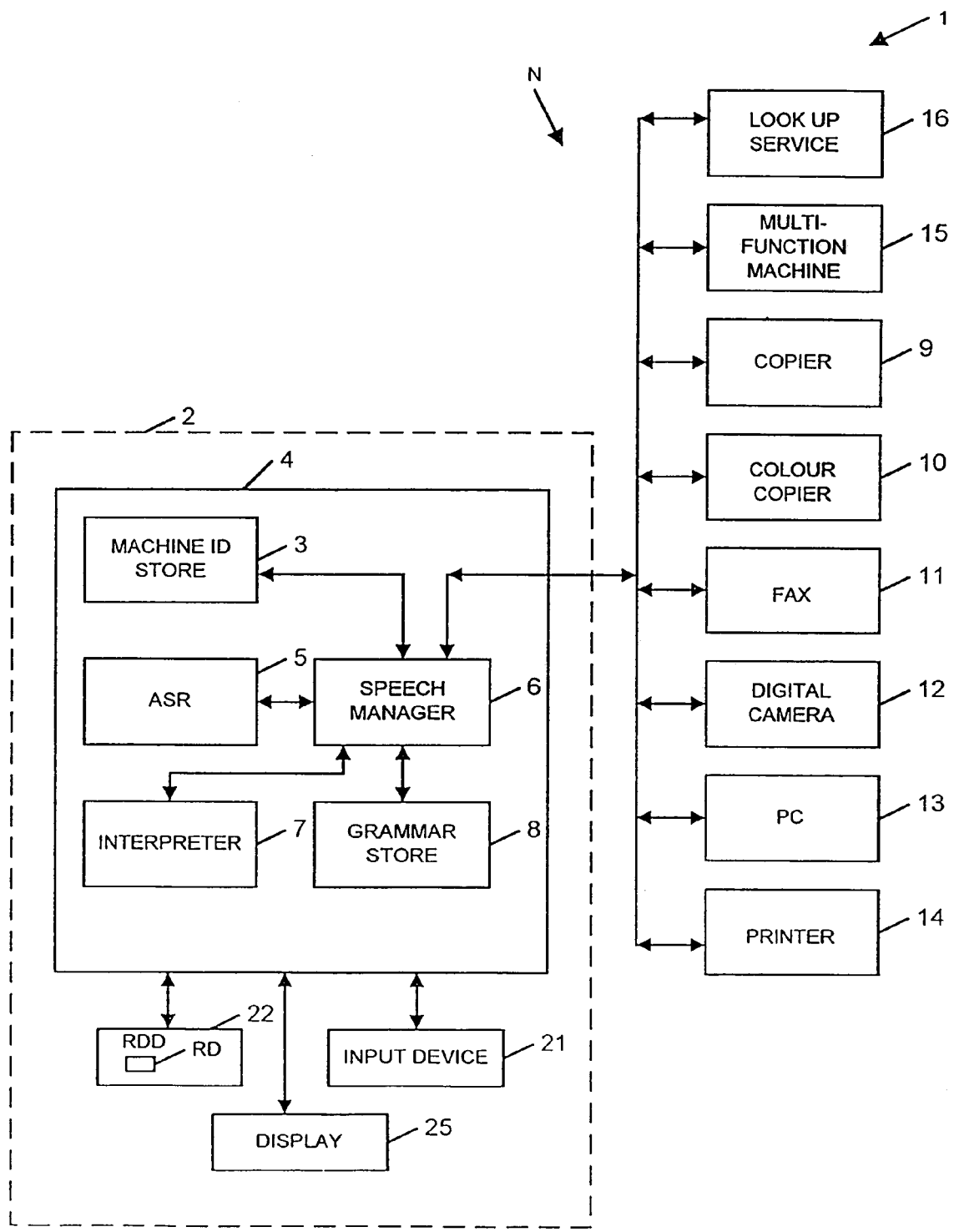
FIG. 1 shows a schematic block diagram of a first embodiment of a system in accordance with the present invention.

FIG. 1 shows by way of a block diagram a system 1 comprising a network N coupled to a number of different items of office equipment that will, in practice, be distributed throughout the building or buildings within which the network is installed. The network may be a local area network (LAN), wide area network (WAN), Intranet or the Internet. It should, however, be understood that, as used herein, the word network does not imply the use of any known or standard networking system or protocols and that the network may be any arrangement that enables communication between machines located in different parts of the same building or in different buildings. By way of example, FIG. 1 shows a black and white photocopier 9, a colour photocopier 10, a facsimile (sometimes referred to as a "fax") machine 11, a digital camera 12, a personal computer 13, a multifunction machine 15 capable of copying, printing and facsimile functions and a printer 14 coupled to the network N. It will, of course, be appreciated that more than one of each of these different types of machines may be coupled to the network.

A speech server 2 is also coupled to the network N. The speech server 2 generally comprises a workstation or the like having a main processor unit 4 which, as known in the art, will include a CPU, RAM and ROM and a hard disc drive, an input device 21 such as, for example, a keyboard and a pointing device such as a mouse, a removable disc drive RDD 22 for receiving a removable storage medium RD such as, for example, a CDROM or floppy disc, and a display 25.

Program instructions for controlling operation of the CPU and data are supplied to the main processor unit 4 in at least one of two ways: 1) as a signal over the network N; and 2) carried by a removable data storage medium RD. Program instructions and data will be stored in the hard disc drive of the main processor unit 4 in known manner.

FIG. 1 illustrates block schematically the main functional elements of the main processor unit 4 of the speech server 2 when programmed to operate in accordance with this embodiment of the present invention. Thus, the main processor unit 4 is programmed so as to provide an automatic speech recognition (ASR) engine 5 for recognising speech data input to the speech server 2 over the network N from any of the machines 9 to 13 and 15, a grammar store 8 storing grammars defining the rules that spoken commands must comply with and words that may be used in spoken commands, and an interpreter 7 for interpreting speech data recognised using the ASR engine 5 to provide instructions that can be interpreted by the machines 9 to 11, 14 and 15 to cause those machines to carry out the function required by the user with overall control of the speech server 2 being effected by a speech manager or processor 6. The speech server 2 also includes a machine identification (ID) store 3 storing data relating to each of the machines as will be described below.

Figure 2:
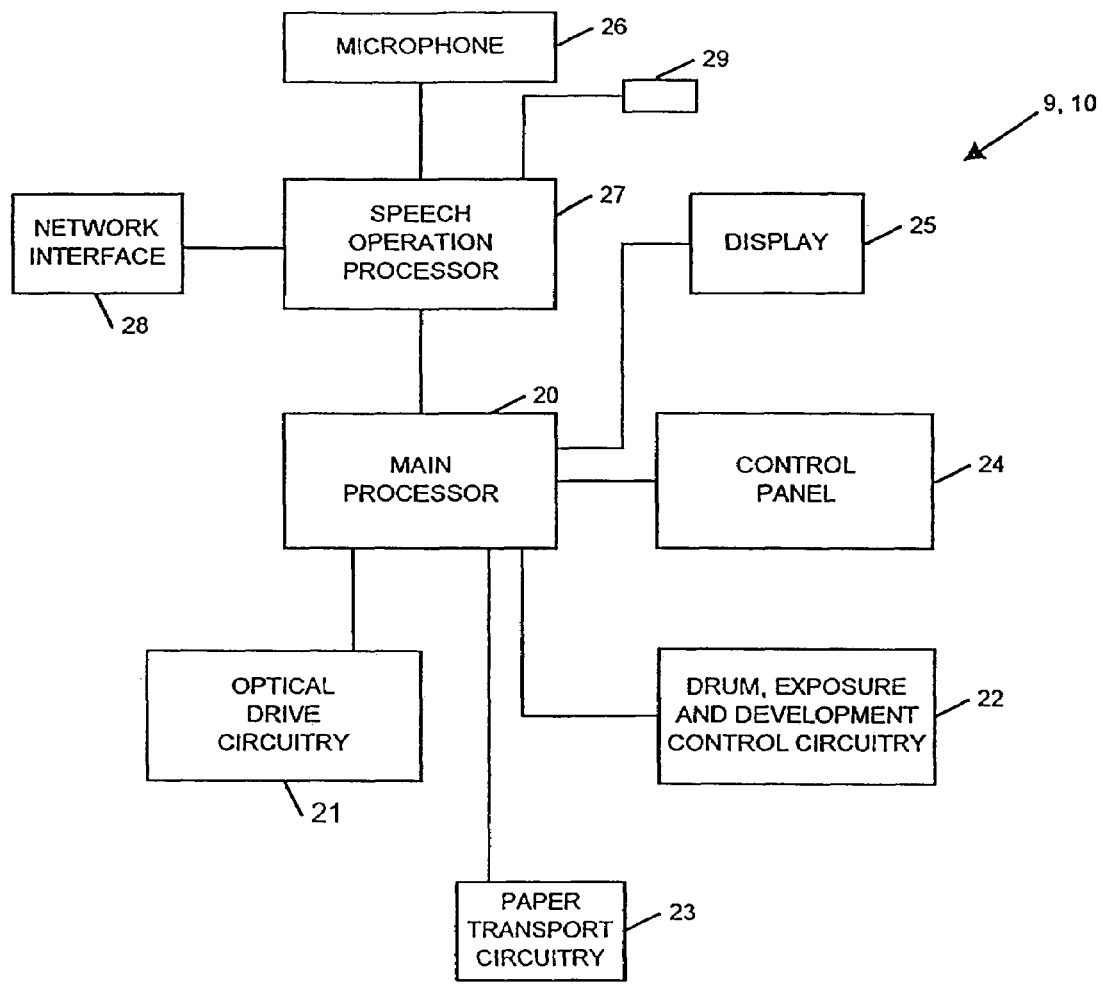
FIGS. 2 to 6 are block diagrams showing, respectively, a copier, a facsimile machine, a digital camera, a personal computer and a printer for connection to the network shown in FIG. 1.

FIG. 2 shows block schematically the functional components of the copier 9 or 10. The copier 9, 10 comprises a main processor 20 coupled via an appropriate interface (not shown) to the machine functional circuitry which, in the case of the photocopier, consists essentially of optical drive circuitry 21, drum, exposure and development control circuitry 22 and paper transport circuitry 23. As is known in the art, the optical drive circuitry 21 controls illumination by the optical system of a document to be copied while the drum, exposure and development control circuitry 22 controls charging and exposure of the photosensitive drum and development of the resulting toner image. The paper transport circuitry 23 controls the transport of paper through the copier. The copier also includes a control panel 24 having manual controls for enabling a user to select the manner, type and number of copies to be produced. Thus, generally, the control panel will enable a user to select whether the copy is to be single or double-sided, collated or not collated etc. Also, in the case of a colour copier the control panel will generally enable the user to select whether a black and white or colour copy is required. The copier also has a display 25 for displaying messages and/or instructions to the user. Typically such a display is a liquid crystal display.

The above-described components shown in FIG. 2 are present in known photocopiers. As shown in FIG. 2, the photocopiers 9 and 10 shown in FIG. 1 differ from known photocopiers in that they also include a microphone 26, a speech operation processor 27 and a network interface 28. The microphone 26 enables words spoken by a user to be converted into electronic speech data while the speech operation processor 27 is arranged to process the speech data for transmission over the network N via the network interface 28. The interface may be any known form of network interface, for example a TCP/IP socket where the network operates on the TCP/IP protocol.

Figure 3:
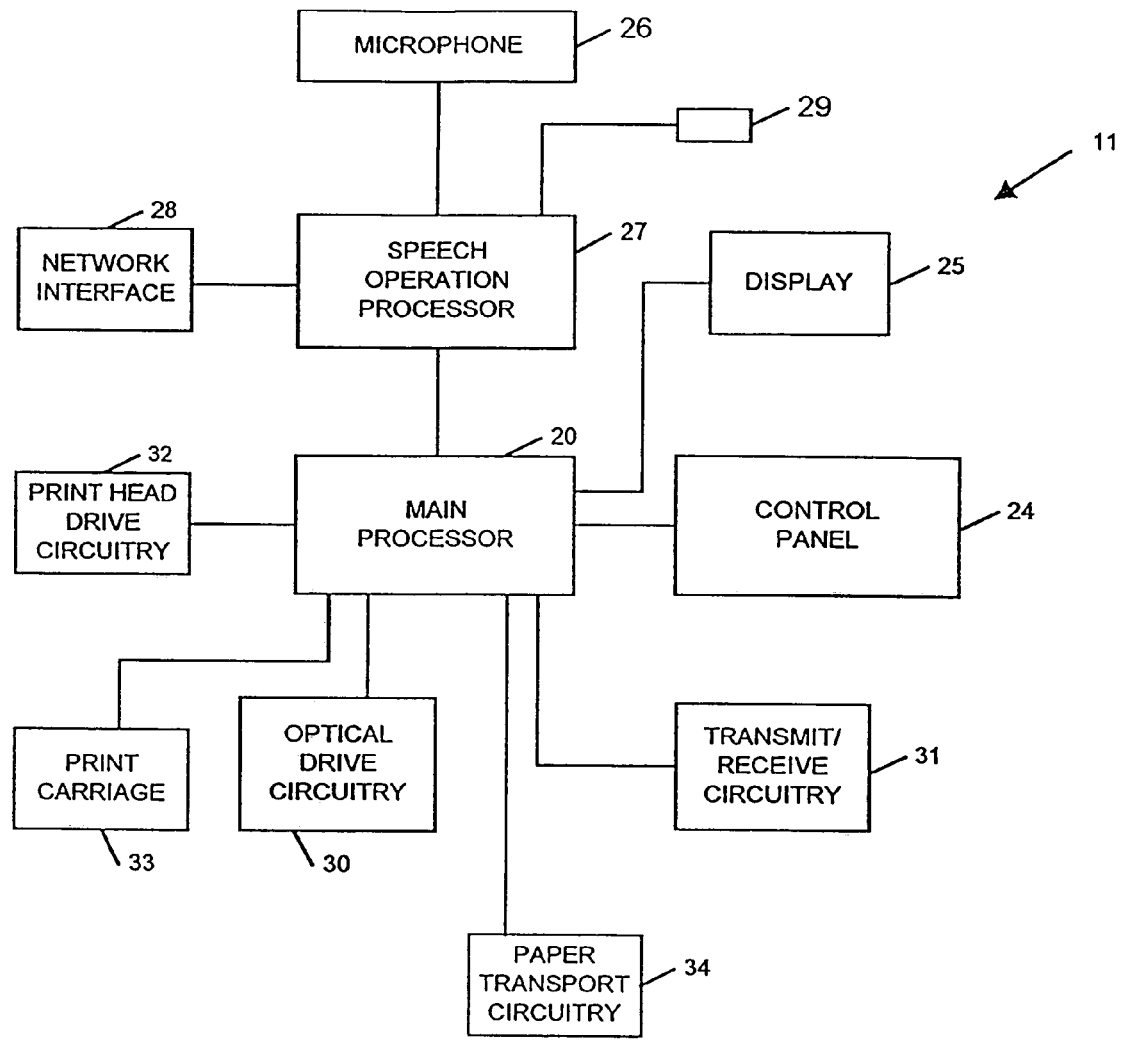

FIG. 3 shows a similar block schematic functional diagram of the facsimile machine 11. The facsimile machine 11 differs from the copier 9 or 10 in terms of its machine functional circuitry and these components of the facsimile machine are known in the art. As shown block schematically in FIG. 3, the machine function circuitry consists of optical drive Circuitry 30 which enables a document to be faxed to be scanned so as to convert the hard copy document into electronic form, transmit and receive circuitry 31 for transmitting and receiving facsimile messages, print head drive circuitry 32, a print carriage 33 and paper transport circuitry 34 for enabling a received facsimile message to be printed out.

Figure 4:
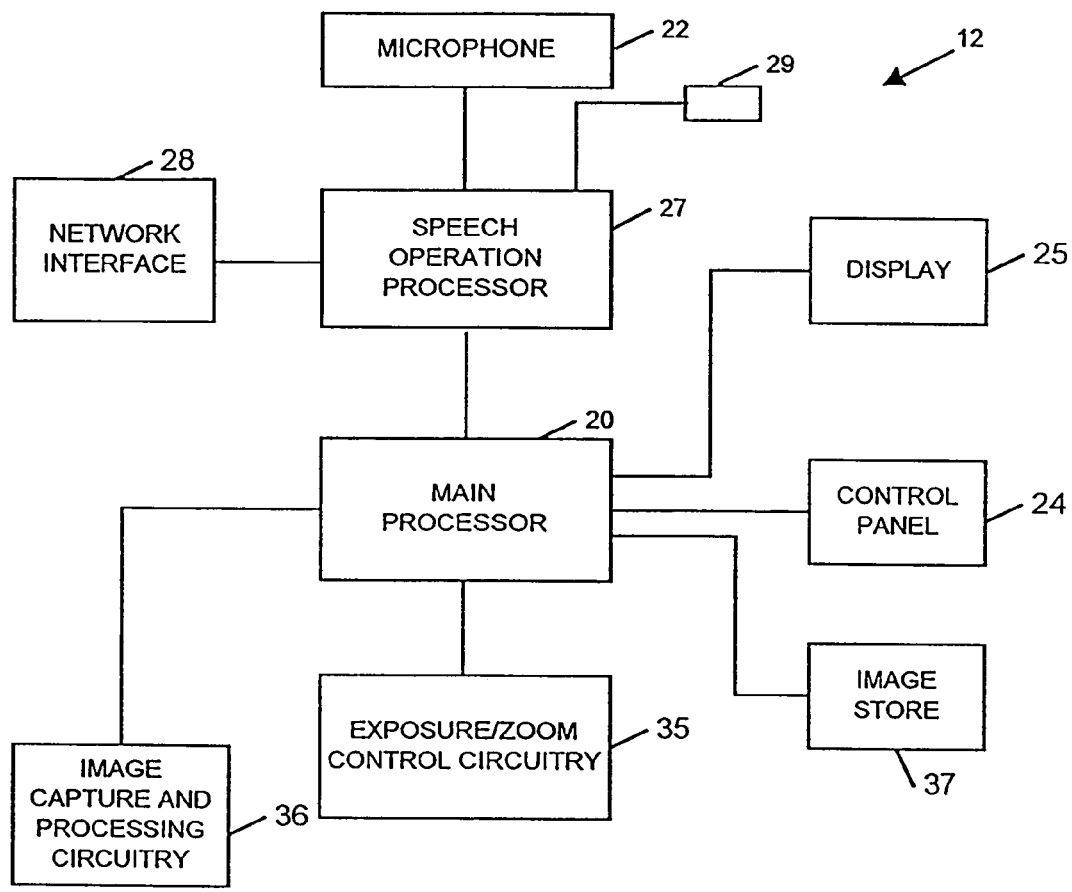

FIG. 4 shows a similar block functional diagram of a digital camera. The digital camera differs from the photocopier 9, 10 in respect of its machine functional circuitry which consists essentially of exposure/zoom control circuitry 35, image capture and processing circuitry 36 which, for example, consists of an optical sensor and image compression circuitry, and an image or frame store 37 for electronically storing images captured by the image capture circuitry 36.

Figure 5:
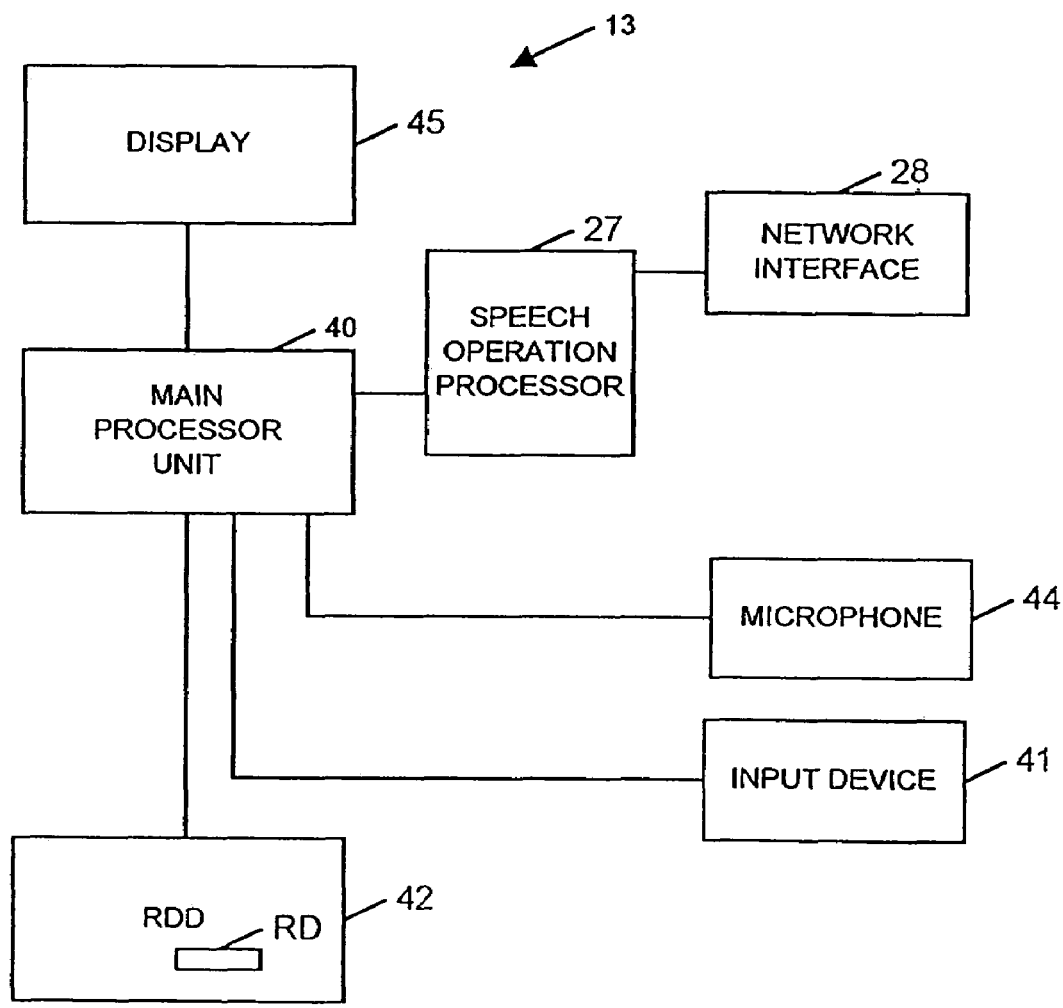

FIG. 5 shows a block schematic functional diagram of the personal computer 13 shown in FIG. 1. The personal computer 13 comprises a main processor unit 40 which, as known in the art, will include a CPU, RAM and ROM and a hard disc drive, an input device 41 such as, for example, a keyboard and a pointing device such as a mouse, a removable disc drive RDD 42 for receiving a removable disc RD such as, for example, a CDROM or floppy disc and a display 45. Like the machines 9 to 12 described above, the personal computer also includes a network interface 28 for enabling connection to the network N and a speech operation processor 27.

Program instructions and data may be supplied to the personal computer 13 connected to the network by supplying computer readable program instructions as a signal over the network N from, for example, another personal computer on the network or a remote device or by supplying computer readable instructions on a removable disc or storage medium RD.

Figure 6:
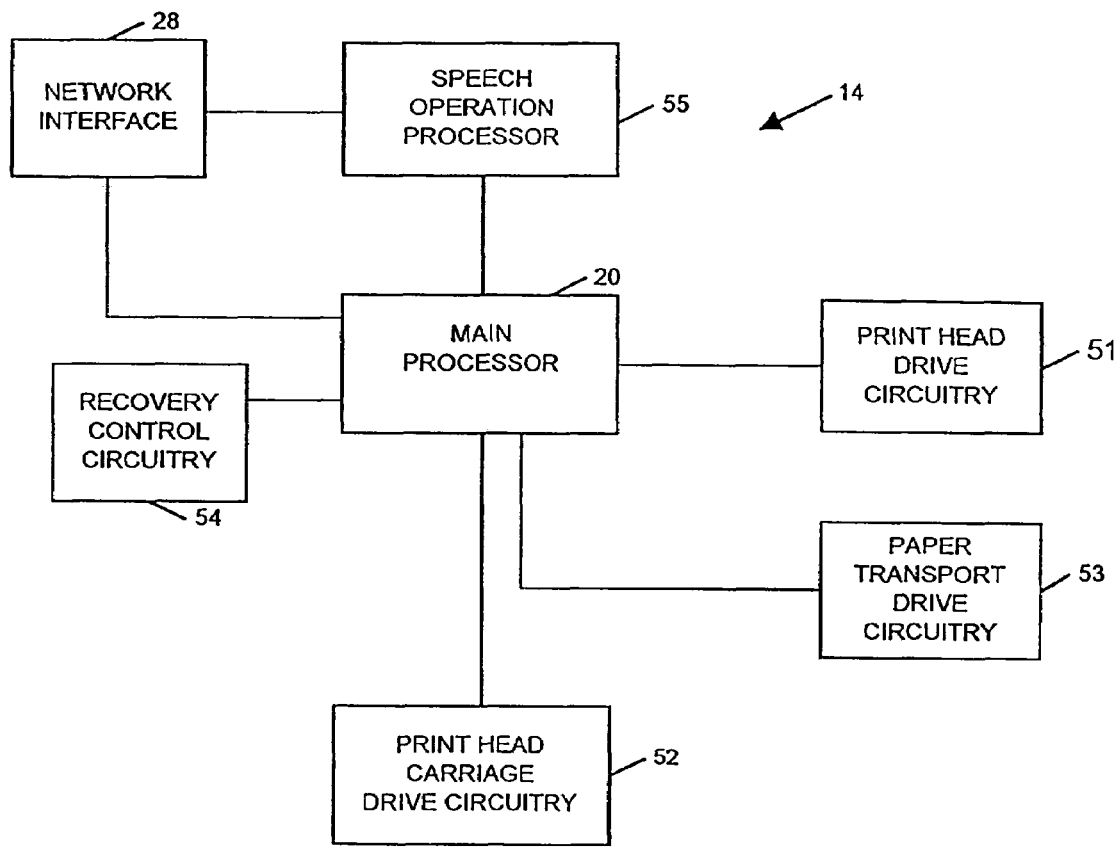

FIG. 6 shows a block schematic functional diagram of the printer 14. The printer 14 has a main processor unit 20 which controls operation of the machine functional circuitry which in this case consists of print head drive circuitry 51, print head carriage drive circuitry 52 and print transport drive circuitry 53. The circuitry 51, 52 and 53 enable the print head of the printer to print upon paper supplied to the printer in known manner. Where the printer is an ink jet printer, then the printer may also include recovery control circuitry 54 for, in known manner, causing the print head to be capped when not in use and for causing the print head to execute preliminary or idle discharge operations to clear any blockages of the ink jet nozzle.

The printer also includes a network interface 28 for enabling connection to the network N and a speech operation processor 55 arranged to receive instructions from the speech server 4 to cause the printer 14 to print in accordance with spoken instructions input, for example, to the personal computer 13 or the digital camera 12. Generally, the printer will not be provided with a microphone for speech command input because it is more convenient for the speech commands to be input from the machine from which the data to be printed is derived. Although not shown, the printer may also include a display.

In order to avoid accidental voice activation of any of the machines 9 to 12, they may be provided with a speech activation switch 29 shown in FIGS. 2 to 4 so that the machine is not responsive to speech input until the switch 29 is activated. A similar function may be provided in software for the personal computer 13 so that it is not possible for a user of the personal computer to send speech instructions to cause operation of a printer or fax machine until the user clicks on an appropriate icon displayed by the display of the personal computer.

The multifunction machine 15 will have all the functionality of the copier 9 or 10, facsimile machine 11 and printer 14.

As noted above, any known form of network N may be used. The speech operation processors 27, 55 and network interfaces 28 are provided as JAVA virtual machines using the JAVA programming language developed by Sun Microsystems Inc.

Each of the processors of the machines described above may be programmed by instructions stored in an associated storage medium and/or by signals supplied over the network N, for example.

The network also includes a look-up service 16 which contains a directory of all of the machines connected to the network together with their characteristics in a manner which enables a list to be extracted from the look-up service 16 of those machines which can perform a particular function. The JINI feature of the JAVA programming language is used so that the look-up service 16 is in the form of JINI look-up service and communication with the JAVA virtual machines forming the speech operations processors 27 is via a JINI service agent that requires only the interface to the machine to be standard so that the network protocols can be completely independent from the machines connected to the network.

Any known form of automatic speech recognition engine 5 may be used. For example, the automatic speech recognition engine supplied by IBM under the trade name "ViaVoice", the engine supplied by Dragon Systems, Inc. under the trade name "Dragon Naturally Speaking", the Microsoft speech recognition engine, the speech recognition engine produced by Nuance and that produced by Lernout and Hauspie. As will be understood by those skilled in the art, the speech manager 6 communicates with the automatic speech recognition engine 5 via a standard software interface known as "SAPI" (speech applications programmers interface) to ensure compatibility with the remainder of the system. In this case the Microsoft (Registered Trade Mark) SAPI is used.

The grammar store 8 stores rules defining the structure of spoken commands or instructions that can be input by a user and words that can be used in those commands. Although it would be possible to have a single grammar encompassing rules for commands for all of the types of machines coupled to the network N, in this embodiment separate grammars are provided for each different type of machine. Thus, the grammar store includes copy, fax and print grammar containing rules and words specific to copy, fax and print functions respectively. This has the advantage of limiting the choice of words available to the ASR engine 5 during speech recognition and so should reduce the possibility of misinterpretation of a word.

Different machines of the same type (for example different photocopiers) are of course capable of carrying out different functions. It is, however, desirable for machines of the same type to use the same grammar so that, for example, the photocopier and the colour photocopier 10 shown in FIG. 1 are associated with the same copy grammar. One reason for this is that it enables a user to become rapidly familiar with the commands that can be used because they are the same for all machines of the same type (for example for all photocopiers). Another reason for this is that the user of a machine may not be fully familiar with the capabilities of that machine and may ask the machine to carry out a function which is not available. If this happens and the command spoken by the user is not available within the associated grammar, then an error may occur because automatic speech recognition engines tend to return the closest possible match to a spoken word. Associating all machines of a given type with the same grammar should increase the possibility of recognition of commands input by a user and reduce the possibility of errors such as a user of the black and white photocopier 9 being presented with "collated" copies (when what he actually wanted were colour copies) because the grammar for the photocopier 9 did not recognise the word "colour". If, as will be described below, the black and white photocopier 9 and the colour photocopier 10 share a copy grammar, then a user requesting the black and white photocopier 9 to produce "four colour copies" can be advised that the black and white photocopier 9 is not capable of making colour copies.

As shown in FIG. 7, the words included in the copy grammar include "copy", "copies" and synonyms such as "reproduce", "print" etc. The copy grammar also includes words relating to the manner in which the copying is to be carried out such as "single-sided", "double-sided", "reduced", "colour", "black and white", "collated", "A4", "A3", "stapled" etc.

The rules of the copy grammar will also look for a number or equivalent word which instructs the machine how many copies are required. These words may be stored in the copy grammar. However, it is more convenient for words shared by the copy, fax and print grammars ("shared words"), including numbers, to be incorporated in a separate, shared words grammar so that these shared words numbers can be accessed by any of the machines and it is not necessary to update the shared words grammar each time a new machine is connected to the network.

FIG. 10 shows a list of words that may be included in a shared words grammar. These include introductory and closing phrases or words such as "please", "could you" etc. common to instructions for any of the machines shown in FIG. 1. The shared words grammar will, of course, incorporate rules which determine whether these words are to be interpreted and, if so, how. Thus, for example, words such as "please", "could you" etc. will be ignored as not requiring interpretation. Although not shown, the grammar store may also include a shared grammar of natural numbers and a shared grammar of telephone numbers.

FIG. 8 shows a list of words that may be included in the print grammar. These include words representing instructions such as "print", "hard copy", "reproduce", words representing the manner in which printing should occur such as "black and white", "colour", "high resolution colour", "photoquality" etc. The print grammar will include pointers to the shared words grammar. The print grammar may also include a list of words that may be used to describe different types of printer such as "laser colour", "ink jet" etc.

FIG. 9 shows a list of words and types of words that may be included in the fax grammar. These words include "fax", "send" and synonyms therefore plus words that may be used in connection with the desired destination of the facsimile message. For example, the fax grammar may include mnemonics, stored names or short codes for facsimile numbers, country and area facsimile codes etc. The fax grammar will also include pointers to the natural number and telephone number grammars where these exist.

The grammar store 8 will also include a JINI look-up service grammar that includes the words that may be used by a speaker to identify a printer desired to be used to print an image generated by a digital camera or personal computer connected to the network.

The above assumes that the user requires an immediate response from the machine. This need not, however, necessarily be the case and fax machines are available that enable a fax to be sent at a later time or date. Accordingly, the grammar store also includes a shared time/date grammar and the fax grammar will include rules as to how time/date inputs are to be interpreted. As shown in FIG. 11, the time/date grammar includes words that may be used in connection with the time or date such as "am", "pm", "o'clock", "morning", "afternoon", "evening", "today", "tomorrow" and days of the week and months of the year. The time/date grammar will also include rules as to how input information is to be interpreted enabling times to be converted to a standard format such as a 24 hour clock. For example, the time/date grammar may include rules requiring the words "ten thirty" to be interpreted as "10:30", unless followed by the abbreviation "pm" in which case the words "ten thirty pm" will be interpreted as "22:30". The time/date grammar will also include rules defining which hours of the day constitute "morning", "afternoon", "evening" and for interpreting words such as "today", "tomorrow", "next Monday" as being specific days of the year defined in terms that can be interpreted by the internal clock and calendar of the speech server, network server and the machine itself.

Each grammar is a non-recursive context free grammar which determines the set of allowable spoken commands or utterances, together with attributes attached to each grammar rule which determine how the meaning is constructed. The attributes consist of fragments of computer codes which are executed in dependence on the syntactic parse structure. In order to illustrate this, examples of rules that may be included in the time grammar are given below. In these examples, the computer programming language used is the Perl programming language.

```
Time={Time1:$time; Time2:$time; Time3:$time} <return
    ($time);>
Time1= {quarter <$m = 15;>; 1to29:m [minutes]} to 1to12:
    $h
    <$hour=$h-1 % 12; $minute= 60-$m;
    $time= "$hour:$minute"; return($time);>
Time2= {half <$m = 30>; quarter <$m = 15>; 1to30:$m
    [minutes]} past 1 to 12:$h
    <$hour = $h; $minute= $m;
    $time = "$hour:$minute";
    return($time);>
Time3= 1to12:$h 1to59:$m
    <$hour = $h;
    $minute = $m;
    $time= "$hour:$minute";
    return ($time);>
```

In these rules the curly brackets { } are used to group together alternative terms, square brackets [ ] denote optional terms and the angle brackets < > contain Perl attributes. The Rule :$x construction is converted into Perl code which assigns the return value of "Rule" to the Perl variable $x. "1to12", "1to29", "1to30" and "1to59" are further rules (not shown) which accept natural numbers in the ranges 1 to 12, 1 to 29, 1 to 30 and 1 to 59, respectively, and return the corresponding value as a Perl variable. Together these rules accept time expressions such as "quarter to ten", "fifteen minutes to ten", "half past ten", "quarter past ten", "fifteen minutes past ten" and "ten fifteen" and convert them all into a meaning of the form "hour:minute".

This grammar is converted into the SAPI recognition grammar used by the ASR engine 5 and a Perl file used by the interpreter 7. In this example the Microsoft (registered trade mark) SAPI is used. Upon compilation, parse tags are added to the SAPI recognition grammar. These parse tags label the individual items of each rule. In this example the PhraseParse method of the Microsoft grammar compiler (which is part of the Microsoft SAPI toolkit) is used to convert a recognised text string into a string of parse tags which indicate the syntactic parse structure of the recognised phrase. This string of parse tags is then passed to the interpreter 7 which executes the Perl code fragments in dependence on the parse structure.

Thus, the above grammar would be converted into the following SAPI 4.0 grammar format:

```
[<Time>]
<Time> = "(1" <Time1>")"
<Time> = "(2" <Time2>")"
<Time> = "(3" <Time3>")"
<Time1> = "(1" <dummy1>")(2" to ")(3" <1to12>")"
<dummy1> = "(1" quarter")"
<dummy1> = "(2" <dummy2> ")"
<dummy2> = "(1" <1to29> ")"[opt] <dummy2b>
<dummy2b> ="(2" minutes ")"
<Time2> = "(1" <dummy3> ")(2" past ")(3" <1to12> ")"
dummy3> = "(1"half ")"
```

```
<dummy3> = "(2" quarter ")"
<dummy3> ="(3" <dummy4> ")"
<dummy4> = "(1" <1to30> ")"[opt] <dummy4b>
<dummy4b> = "(2" minutes ")"
<Time3> = "(1" <1to12> ")(2"<1 to 59> ")"
<1to12> = . . .
<1to29> = . . .
<1to30> = . . .
<1to59> = . . .
``` wherein the items enclosed in " " are the parse tags and the rules <dummy . . . > are automatically generated by the pre-processor to make conversion to the SAPI 4.0 format possible.

In this example the phrase "ten minutes to two" would be converted into the following string of parse tags:

(1(1(2(1 . . . )(2)))(2)(3 . . . )

where the two sets of ellipses would be filled in by parse tags from the rules "1to29" and "1to12", respectively. Similarly "half past ten" would be converted to the following string of parse tags:

(2(1(1))(2)(3 . . . )

with ellipses filled in from the rule "1to12".

The interpreter 7 then determines which bits of the Perl code to execute using the string of parse tags.

It will, of course, be appreciated that any known method may be used to determine the syntactic parse structure from a recognised phrase and that, moreover, the specific manner on which the rules are implemented and interpreted is not essential to the present invention. Any grammar structure that defines the set of allowable spoken commands or utterances and associates with each grammar rule attributes or data that determines how the meaning is constructed or extracted may be used.

The rules of the various grammars define the structures or formats of commands that are recognised by the grammars. Each grammar may include several different valid structures or formats. In this embodiment, the print grammar recognises the following two rules defining the structure or format of instructions:

Rule 1) [make] {a; and; 1–99} {copy; copies} [What-Phrase] [CopyFeature];

Rule 2) {copy; duplicate} [WhatPhrase] [HOW MANY] [CopyFeature].

In these rules square brackets are used to identify optional terms while curly brackets are used to group together alternative compulsory terms. Thus, in rule 1, the instruction format expected is an optional opening or introductory remark such as the word "make" followed by the word "a", "an" or a number between 1 and 99 representing the number of copies followed by the word "copy" or "copies" optionally followed by a phrase that identifies the document to be copied ("WhatPhrase") optionally followed by a copy feature ("CopyFeature") identifying the manner in which the copying is to be carried out.

The individual components of this basic rule may be associated with sub-rules. For example, the "CopyFeature" is associated with the different ways of copying such as: "enlarged, reduced, collated, sorted, stapled, lighter, darker, colour, black and white etc." and each of these may in turn be associated with a sub-rule which defines the structure of a command relating to that particular copy feature.

As an example, if a person says "Make one copy of this document in black and white", the copy grammar will determine that the instruction complies with rule 1.

However, this copy grammar will not recognise the instruction "Please make a black and white copy" because the phrase "black and white" precedes the word "copy" and so the instruction does not comply with either rule 1 or rule 2. A modification of rule 1 may be stored in the copy grammar so as to enable a copy feature such as "colour" or "black and white" to precede the word "copy" or "copies".

In the case of copy features such as "enlarge" and "reduce", the copier needs further information to enable copying to be carried out, in particular the amount or degree of enlargement or reduction. Accordingly, the copy grammar will include appropriate sub-rules. Thus, for the copy feature "enlarge", then the sub-rule will define the valid structures and options for enlargement. For example, the sub-rule may expect the word "enlarge" to be followed by a paper size such as "A3" or "A4" or a word such as "maximum" or "max", a percentage or a multiplication. For example, the enlargement sub-rule may accept as a valid complete command "Enlarge this to A3" or "Enlarge this two times" but would require further instructions if the command spoken was simply "Enlarge this".

Copy rule 2 requires the instruction to start with the word "copy" or a synonym therefore such as "duplicate" optionally followed by a phrase representing what is to be copied itself optionally followed by a word or number identifying the number of copies and itself optionally followed by a word or phrase identifying a copy feature such as those set out above. For example, if a user simply says "Please copy this", then the copy grammar will identify this phrase as complying with copy rule 2 and will, as the default, determine that a single copy is required.

In a similar manner, the fax grammar includes a basic rule that expects a phrase of the type [please] {fax; send} [What Phrase] {mnemonic; shortcode; fax number} [time/date].

Thus, the fax grammar expects an instruction which may include an optional introductory word or remark such as the word "please" followed by a compulsory instruction in the form of the word "fax" (or a synonym such as the word "send") followed by an optional phrase identifying the document to be faxed such as the word "this" followed by a compulsory word, phrase or string of numbers identifying the destination of the fax followed optionally by words or numbers identifying the time and date of faxing. For example, this fax rule would accept as legitimate the phrase "Please fax this to Tom at 2 pm tomorrow" if the word "Tom" is included in the mnemonics or names stored in the fax grammar. This fax grammar would not, however, accept a phrase of the type "Please fax tomorrow at 2 pm to Tom" because the instruction order is wrong. However, the fax grammar may include an alternative rule for which this command would be valid.

The rules of the print grammar will follow the same basic principles as the copy grammar and may include the following basic rule: [please make] {a; an; 1 to 99;} {copy; hard copy; copies} [WhatPhrase] [CopyFeature] -[PrinterIdentifier]. In this case the printer identifier will be a word identifying the printer such as "colour laser" ink jet etc. as shown in FIG. 8 and the copy feature may be for, example, colour, high resolution, photo-quality, reduced, enlarged etc. As in the case of the copy grammar there will be sub-rules for features such as enlarged, reduced etc.

The above printer rule is thus essentially similar to the copy grammar rule 1 but includes an additional optional component so that, for example, the instruction "Please print one copy black and white using the ink jet printer" is accepted as valid.

As explained above, each of the grammars may include a number of different valid formats or structures for entering commands. Although the definition of a number of valid commands, structures or formats means that not all commands input by a user will be recognised, the use of specified structures or rules for the input of commands assists in interpretation of the input instructions and reduces the possibility of ambiguity so that, for example, differentiation can be made between the numeral "2" and the word "two" on the basis of location within the input command. This should also facilitate identification and separation of numbers such as telephone numbers from numbers identifying times or dates or numbers of copies, for example.

Figure 12:
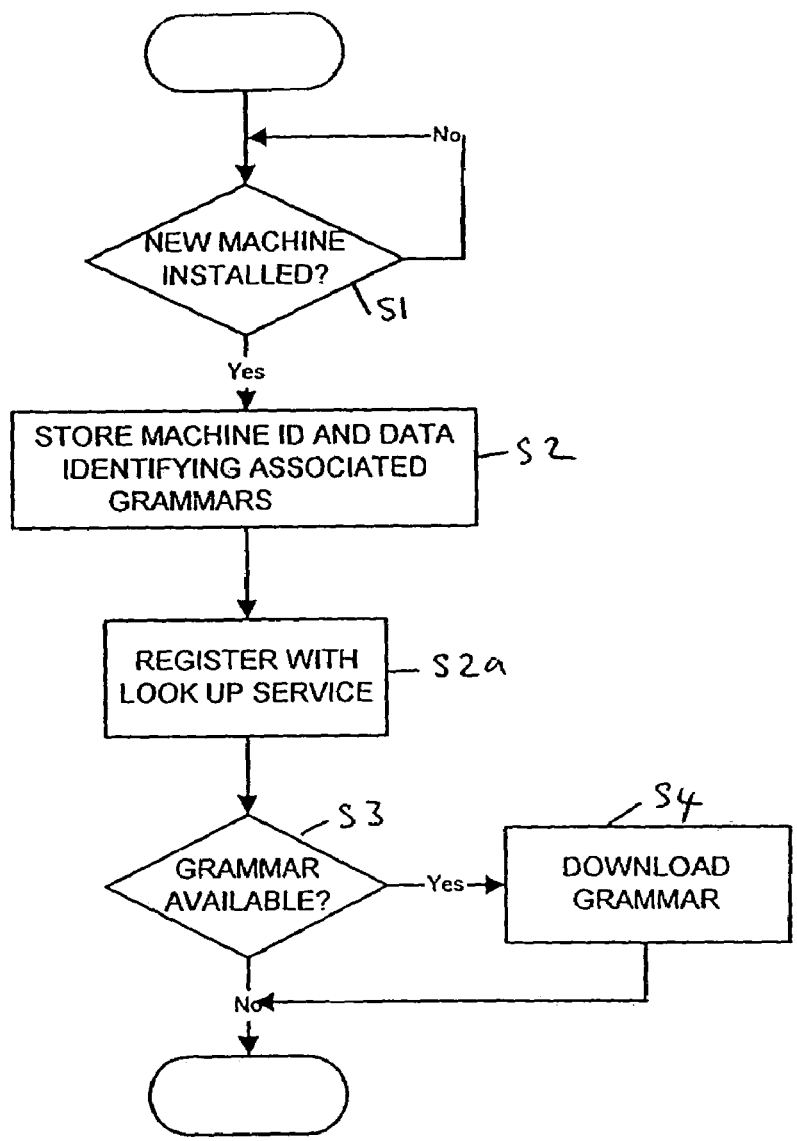
FIG. 12 shows a flowchart for illustrating installation of a machine onto the network shown in FIG. 1.

The manner in which a piece of office equipment such as one of the machines 9 to 15 shown in FIG. 1 is coupled to the network N will now be described with reference to the flowchart shown in FIG. 12.

Because the JAVA/JINI platform is being used, a new machine is automatically located by the speech server on installation at step S1 and the machine ID and data identifying the associated grammars is stored in the machine ID store 3 at step S2. The new JINI compliant machine is also automatically registered with the JINI look-up service 16 so that the details of the new machine and the functions it is capable of performing are stored in the look-up service at step S2a. FIG. 13 shows an example of the type of data that may be held in the look-up service 16 for the copier 9.

The speech server 2 then determines whether all of the associated grammars identified in the machine identification data are already available in the grammar store 8 at step S3. If the answer is no, then the speech server 2 communicates with the newly installed machine requesting the newly installed machine either to supply a copy of the associated grammar(s) stored in the memory of its speech operational processor 27 or to provide the speech server 2 with a network or an Internet or worldwide web address from which the speech server 2 can download the grammar(s) (step S4 in FIG. 7). The speech server 2 will also check whether the newly installed machine has information regarding updates for existing grammars and, if so, will download these to replace the older existing versions.

The procedure described above with reference to FIG. 12 will be the same regardless of the type of JINI compliant machine being installed on the network although, of course, the information in the grammars will vary dependent on the type of machine.

Operation of the system shown in FIG. 1 will now be described with reference to FIGS. 14 to 24.

Figure 14:
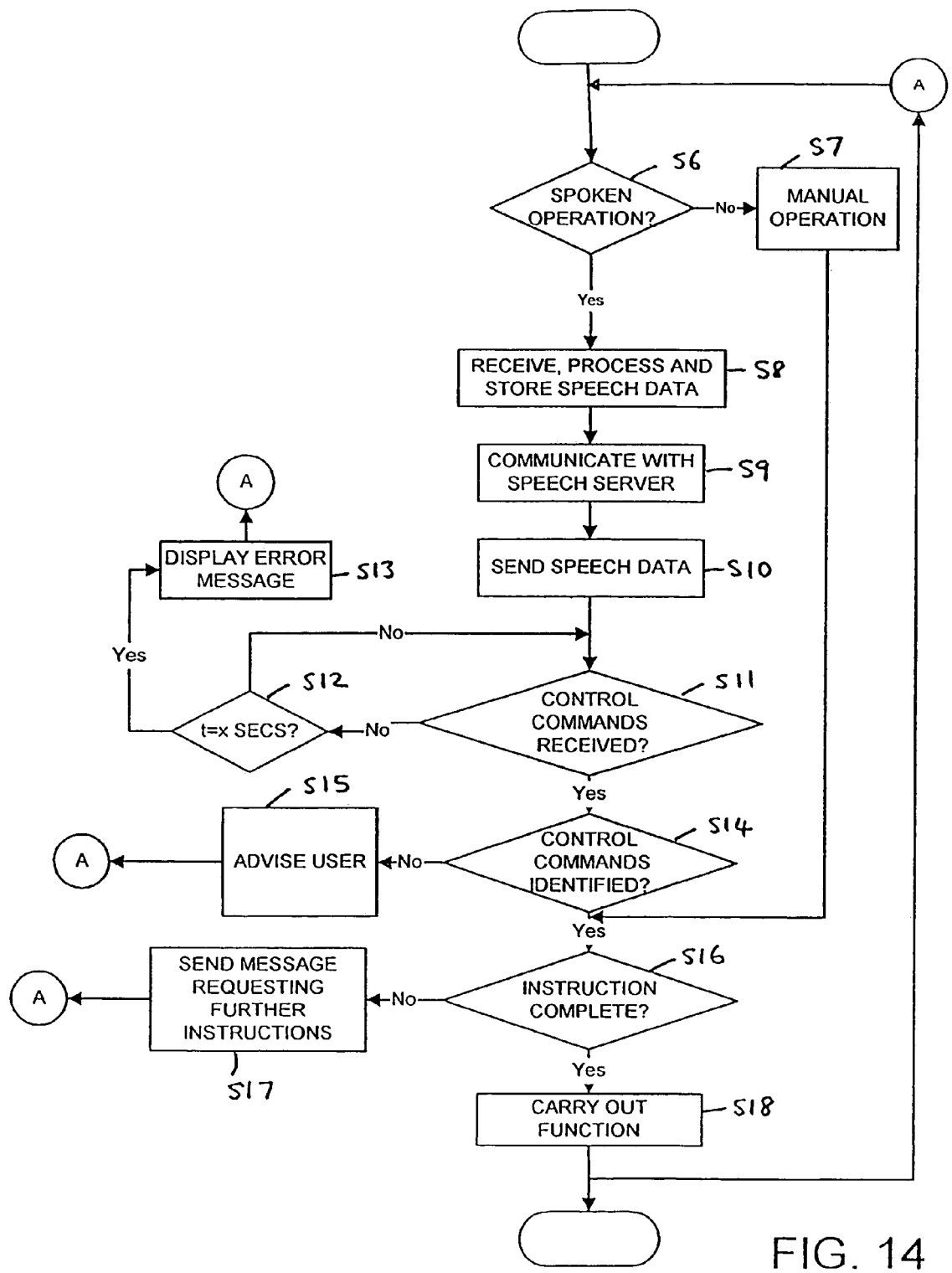
FIG. 14 shows a top level flowchart for illustrating functioning of a machine coupled to the network shown in FIG. 1.
Figure 15:
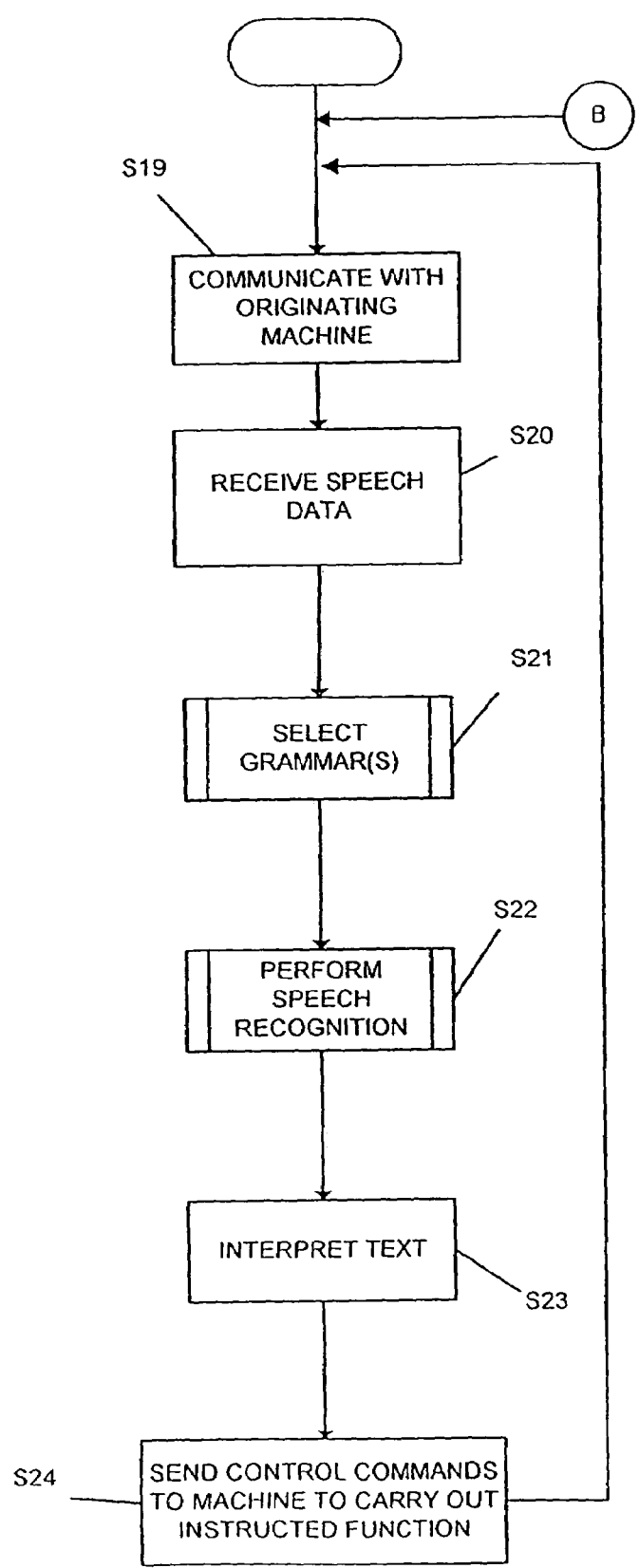
FIG. 15 shows a top level flowchart illustrating functions carried out by a speech server of the system shown in FIG. 1.

FIGS. 14 and 15 are top level flowcharts illustrating, respectively, the functions carried out by a machine having a copying or facsimile transmission function (machines 9 to 11 and 15 in FIG. 1) at which a user is inputting instructions (the "originating machine") and the corresponding functions carried out by the speech server 2.

At step S6 in FIG. 14, the main processor of the originating machine checks to see if spoken operation of the machine has been instructed. If the answer is no, the machine responds to instructions input manually using the control panel 24 (see for example FIGS. 2 to 4) at step S7 and, if the instruction is complete at step S16, proceeds to cause the machine to carry out the required function at step S18.

If, however, the main processor of the originating machine determines at step S6 in FIG. 14 that its speech operation activation switch 29 has been activated, then the speech operation processor 27 will receive, process and store speech data input via the microphone 22 ready for transmission to the speech server 2 via the network N in accordance with the network protocol (step S8).

Before sending the received speech data, the speech operation processor 27 needs to establish communication with the speech server 2. This is illustrated by steps S9 and S19 in FIGS. 14 and 15, respectively. Generally, this communication involves the originating machine sending over the network a message to the speech server 2 identifying itself and requesting permission to send speech data to the speech server 2 (step S9 in FIG. 14). In response to receipt of such a request, the speech manager 6 of the speech server 2 identifies the machine making the request and in response sends a message either granting or denying the request (step S19 in FIG. 15).

Once the originating machine receives from the speech server 2 a message granting its request to send speech data, then the speech operation processor 27 of the originating machine sends the speech data (step S10 in FIG. 14) which is received by the speech server 2 at step S20 in FIG. 15. Initially the speech manager 6 will use a general start-up grammar for speech recognition. This start-up grammar may consist of all available grammars or just a set of rules and words that may be used at the start of a command. Having identified the originating machine, the speech manager 6 selects, using the data stored in the machine ID store 3, the grammars associated with the originating machine from the grammar store 8 at step S21 and then controls the ASR engine 5 to perform speech recognition on the received speech data in accordance with the selected grammars at step S22 in FIG. 15. Once the ASR engine 5 has completed the speech recognition process, the speech manager 6 causes, at step S23 in FIG. 15, the interpreter 7 to interpret the recognised speech to produce language independent device control commands that can be used by the speech operation processor 27 of the originating machine to supply to the main processor 20 of that machine control commands emulating those that would have been supplied if the command had been entered manually using the control panel 24.

The speech manager 6 then communicates with the originating machine, sends the device control commands produced by the interpreter 7 to the originating machine at step S24 and then returns to step S19 awaiting further communication from machines on the network N.

If no device control commands or instructions are received by the originating machine at step 11, the machine waits for a predetermined period of time at step S12 in FIG. 14 and, if no response is received from the speech server 2 after that predetermined period of time, displays to the user at step S13 in FIG. 14 an error message. The speech operation processor 27 then returns to point A in FIG. 14 and awaits further manual or spoken input by the user.

Once device control commands have been received at step S11 in FIG. 14, the speech operation processor 27 processes these device control commands and provides to the main processor 20 control commands emulating those that would have been provided if the instructions had been input via the control panel. The main processor 20 then compares the received control commands with the control commands associated with that machine at step S14. If the received control commands are not recognised, the main processor 20 advises the user accordingly at step S15 in FIG. 14 and the speech operation processor 27 and main processor 20 return to point A in FIG. 14 awaiting further input from the user.

Because the system 1 shown in FIG. 1 includes the look-up service 16, if the received control commands are not recognised, the machine can request (step S151 in FIG. 18) the look-up service 16 to search its database for a machine that can perform the requested function and, when the look-up service 16 returns the requested information, display a message to the user on the display 25 saying "This machine cannot do . . . . However machine . . . . can." (step S152 in FIG. 18). For example the message "This machine cannot do colour copying. However machine No. 10 can." may be displayed if the user has requested colour copies from copier 9. This allows the user the options of moving to the machine that can carry out the required function or of modifying his original request so that the current machine can carry it out.

If the main processor 20 identifies the control commands at step S14, then the main processor 20 will proceed as if the control commands had been input using the control panel 24. Thus, at step S16 in FIG. 14, the main processor 20 will determine whether the instruction input by the user is complete. For example, where the originating machine is the photocopier 9 and the user has requested an enlarged copy but has not specified the degree of enlargement, then the main processor 20 will determine at step S16 that the instruction is incomplete and will display to the user at step S17 a message requesting further instructions. In this example, the message will request the user to input the degree of enlargement. The main processor 20 and speech operation processor 27 will then return to point A in FIG. 14 awaiting further manual or oral input from the user.

It will be appreciated from the above that instructions can be input by a user to the machines 9, 10 or 11 using a combination of manual and orally entered commands so that, for example, when further information such as the degree of enlargement is requested that can be input orally or manually using the control panel 24. The reason for this is that, as shown in FIG. 14, when the speech operation processor 27 and main processor 20 of the machine 9, 10 or 11 has either carried out the requested function (step S18) or displayed a message to the user (step S13, S15 or S17), the machine returns to point A in FIG. 14 awaiting further manual or oral instructions.

Although the speech server 2 may access the entirety of the grammars associated with the originating machine 9, 10 or 11 each time the speech server 2 receives speech data from that machine, it is more efficient and accurate for the speech operation processor 27 and speech server 2 to operate in different dialogue states dependent upon the nature of the instruction input by the user so that, for example, each time the originating machine prompts the user to input further instructions at step S17 in FIG. 14, the speech operation processor 27 enters a different dialogue state and, when further instructions are input by the user, transmits this different dialogue state to the speech server 2 to enable the speech manager 6 to access only the grammars or grammar portions relevant for that dialogue state. This will now be described in detail taking as a first example the case where a user wishes to use the multifunction machine 15 to produce an enlarged copy.

Figure 19:
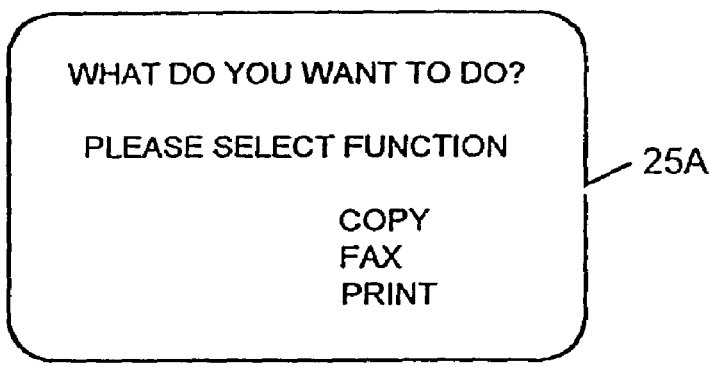
FIGS. 19 to 24 show screens displayed to a user during operation of the system shown in FIG. 1.

As described above with reference to FIG. 14, the machine 15 will normally be in an initial state awaiting input of instructions from a user. In this state, the main processor 20 of the multifunction machine 15 will cause its display 25 to display to the user a message requesting the user to select one of the available functions. FIG. 19 shows a typical message on the screen 25A of the display 25. As shown, the display may list the available functions.

In this example, the user wishes to use the copying function of the machine 15 and so, after operating the speech activation switch 29, inputs via the microphone 29 the command "copy" or a phrase incorporating that word such as "I wish to copy".

The speech operation processor 27 then processes and stores the entered speech data at step S8 in FIG. 14 ready for transmission on the network and communication between the machine 15 and the network server 2 in preparation for sending of the speech data to the speech server is carried out at steps S9 and S19 in FIGS. 14 and 15 respectively.

Once the machine 15 has successfully received from the speech server 2 permission to send the speech data, the speech operation processor 27 of the machine 15 sends the speech data to the speech manager over the network and in accordance with the network protocol together with information identifying the dialogue state of the machine. Initially, the machine will be in a start-up dialogue state (step S121 in FIG. 16) and accordingly the speech manager 6 will select at step S121a in FIG. 16 the general start-up grammar that, as noted above, may consist of all the grammars stored in the grammar store 8.

The speech manager 6 then causes the ASR engine 5 to perform speech recognition on the received speech data using the selected grammar to extract the meaning from the received speech data (step S22 in FIG. 15 and step S221 in FIG. 17) and then checks whether the results of the speech recognition include unidentified words or phonemes at step S222. If the answer is yes at step S222, then the speech manager 6 determines that the input words were incomplete and sends to the originating machine a message that the words were not recognised together with instructions to cause the originating machines to display a message to the user indicating that the instructions were not recognised (step S223 in FIG. 16). The speech manager 6 then returns to point B in FIG. 15 awaiting further communication requests from machines coupled to the network.

Figure 17:
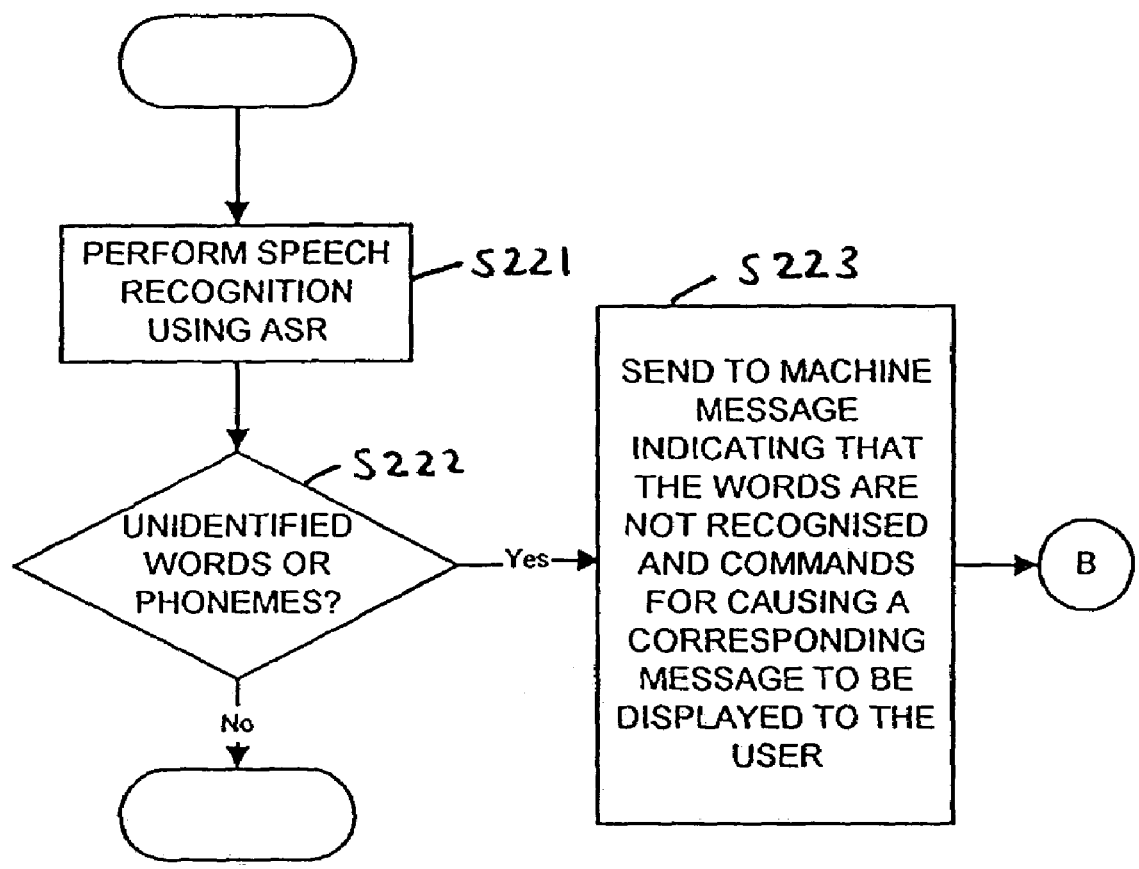
FIG. 17 shows a flowchart for illustrating the performing of speech recognition by the speech server shown in FIG. 1.
Figure 18:
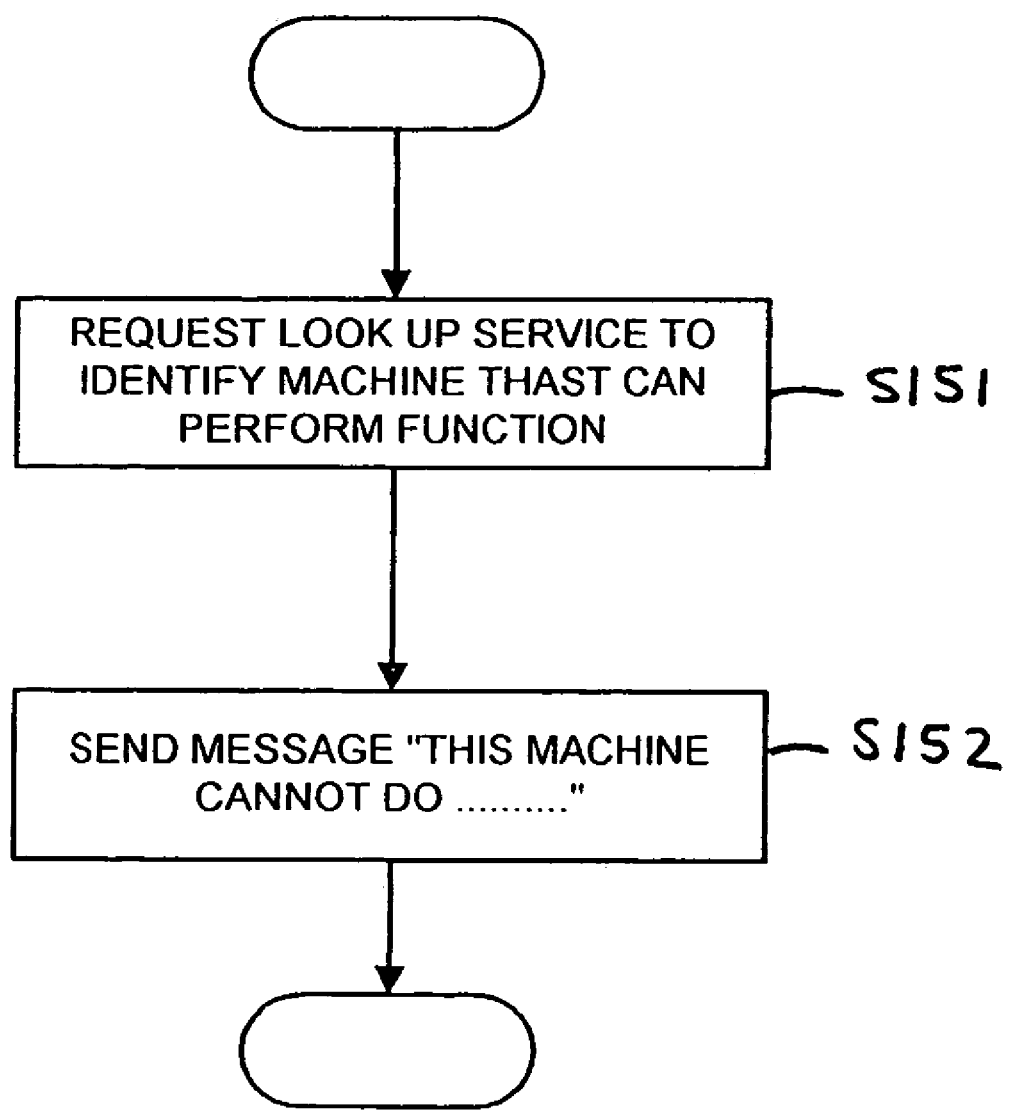
FIG. 18 shows a flowchart for illustrating in greater detail the manner in which a user is advised if a machine cannot carry out the requested function.

Assuming that the answer at step S222 in FIG. 17 is no, then the speech manager controls the interpreter 7 at step S23 in FIG. 15 to interpret the results of the speech recognition process to produce language independent device control commands which are then sent to the originating machine, in this case the multi-function machine 15.

Figure 20:
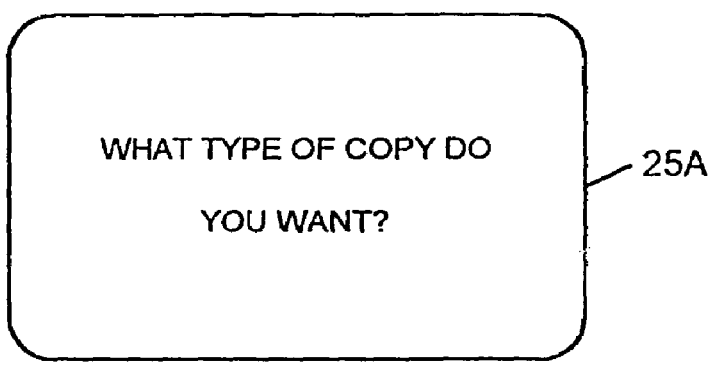

In this example, the user has input to the multi-function machine 15 a command indicating that the copy function is required and accordingly the ASR engine 5 will have recognised the word "copy" and the interpreter 7 will interpret this as a language independent command for the machine 15 to enter the "copy" dialogue state. When this command is received by the multi-function machine 15, the speech operation processor 27 and main processor 20 will cause the machine 15 to enter the copy dialogue state and to display on the screen 25 a message requesting further instructions from the user. FIG. 20 shows the screen 25A of the display illustrating a typical message: "what type of copy do you want?".

The multi-functional machine 15 is now in a dialogue state in which it expects the user to input a command that complies with the grammar rules of the copy grammar and the shared words and time/date grammar. When such a command is received from the originating machine (step S20 in FIG. 15), the speech manager 6 determines from the information accompanying the speech data that the originating machine is in a copy dialogue state (step S122 in FIG. 16) and accordingly selects the copy, shared words and time/date grammars at step S123 in FIG. 16. The speech manager 6 then causes the ASR engine 5 to perform speech recognition (step S22 in FIG. 15) using the selected copy, shared words and time/date grammars and, assuming the answer at step S222 in FIG. 17 is no and there are no unidentified words or phonemes, then the speech manager 6 controls the interpreter 7 at step S20 in FIG. 15 to interpret the results of the speech recognition process to produce language independent device control commands which are then sent to the originating machine. As will be explained below, these device control commands may enable the originating machine to carry out the required function or may cause the originating machine to enter a dialogue state subsidiary to the copy dialogue state in which it is expecting further instructions in relation to the copy command input by the user.

Figure 16:
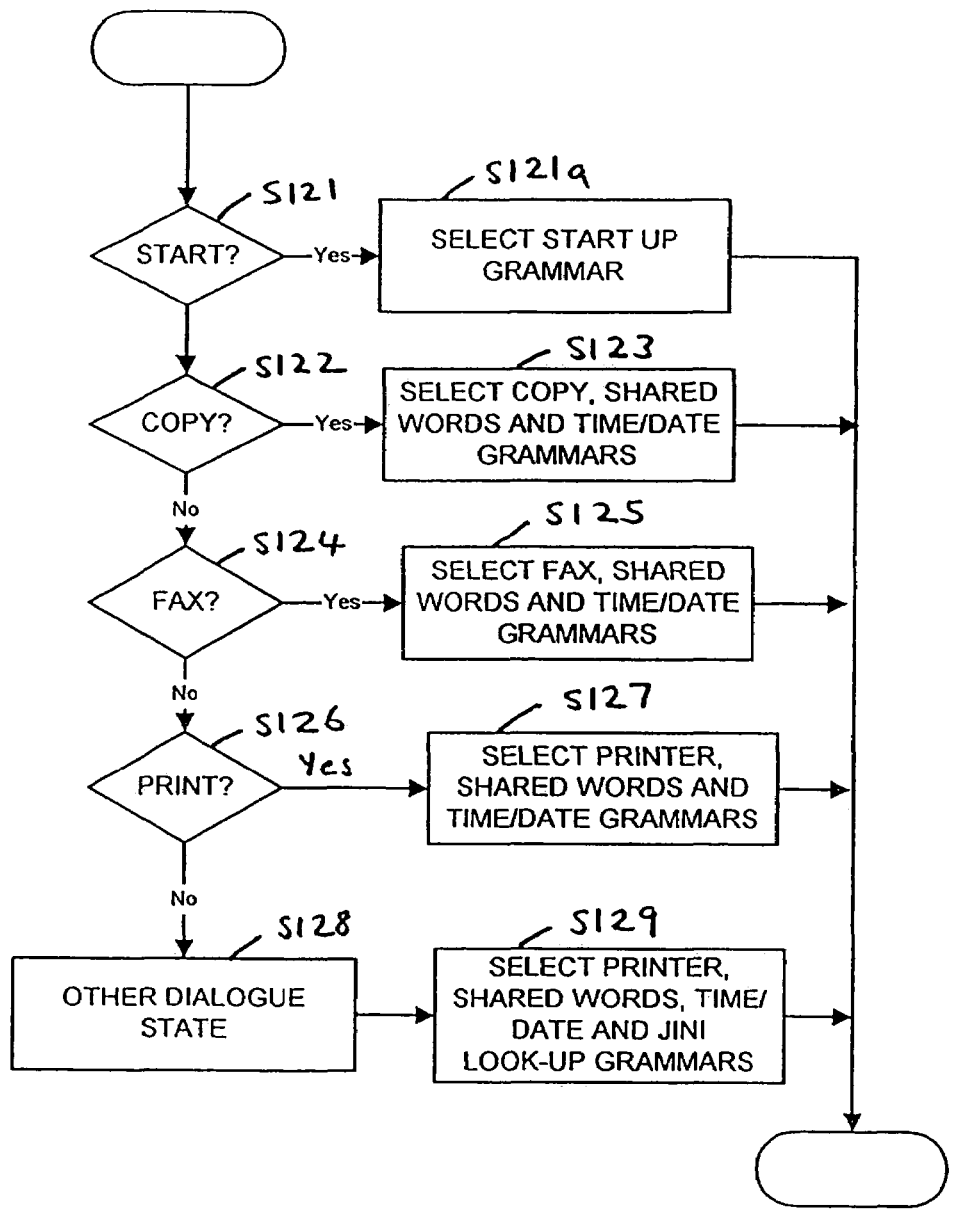
FIG. 16 shows a flowchart for illustrating selection of a grammar from the grammar store shown in FIG. 1.

It will, of course, be appreciated that if the user had input to the multi-function machine 15 a command indicating that the fax or print function is required so that the answer at step S124 or S126 in FIG. 16 was yes, then the fax, shared word and time/date grammars or the printer, shared words and time/date grammar would have been selected at step S125 or S127 instead of the copy, shared words and time/date grammar. If at step S128 in FIG. 16, the speech manager 6 determines from the information accompanying the speech data that the originating machine is in a dialogue state other than the top level or basic copy, fax or print dialogue state, then the speech manager 6 will select at step S129 the grammar or grammar portions relevant to that dialogue state. Such a dialogue state would arise where, for example, the originating machine requires additional instructions to complete a copy function as will be described in greater detail below.

Two different examples of copy commands will be described below.

In a first example, the user inputs the command "Please make a black and white copy" in response to the screen 25A shown in FIG. 20. When this command is received by the speech operation processor 27, then steps S8 to S10 of FIG. 14 are carried out as described above and the speech operation processor waits at step S11 in FIG. 14 for device control commands from the speech server 2. The speech server 2 processes the received speech data as described above with reference to FIG. 15 using the copy, shared words and time/date grammars and returns to the machine device control commands to instruct the machine to make one black and white copy of the document placed on the copy glass of the machine 15 by the user. Upon receiving these device control commands, the speech operation processor 27 determines that the machine 15 is, in this example, capable of carrying out the requested function and accordingly supplies to the main processor 20 instructions emulating those that would have been supplied if the user had used the control panel 24 to input the instructions.

Figure 21:
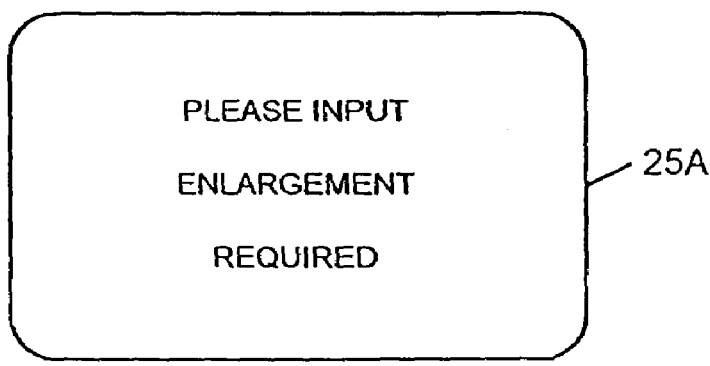

In the above first example, the instructions supplied in response to the prompt shown in FIG. 20 were complete. The second example to be described represents a case where the instruction supplied by the user is incomplete. In this example, in response to the prompt shown in FIG. 20, the user inputs the command "Please make a black and white copy enlarged". This input speech data is communicated to the speech server 2 and processed as described above with reference to FIGS. 14 and 15 so that the speech server 2 sends back to the originating machine 15 language independent device control commands that the speech operation processor 27 processes to supply to the main processor 20 instructions that emulate the instructions that would be received by the main processor 20 if the user had manually requested a black and white enlarged copy. The main processor 20 determines that the user has not specified the degree of enlargement required and accordingly displays on the screen 25A of display 25 a message requesting the user to enter the degree or amount of enlargement required. A typical message is shown in FIG. 21. The speech operation processor 27 is now in an auxiliary dialogue state in which it is expecting input by the user of spoken or manual commands in response to the prompt shown in FIG. 21.

In this example, it is assumed that the user inputs the further commands using the microphone 22. These auxiliary instructions are then communicated to the speech server 2 as speech data accompanied by information indicating the auxiliary dialogue state of the machine 15. The speech data is processed as described above with reference to FIGS. 14 to 18. However, in this case, the speech manager 6 determines at step S128 in FIG. 16 that the originating machine is in an auxiliary dialogue state, identifies this dialogue state from the information supplied by the machine 15 and selects the appropriate portions of the copy grammar at step S129 in FIG. 16, in this example the copy feature dialogue state "enlarge". The speech manager 6 thus selects the portion (sub-grammar) of the copy grammar which relates to enlargement and includes rules and words determining the manner in which enlargement may be specified by the user. For example, the enlargement section of the copy grammar may enable input of commands such as "to A3", "as big as possible", "x times" where x is an integer, or "y %" where y is a number greater than 100. The speech manager 6 then controls the ASR engine 5 to interpret the speech data received from the machine 15 using this "enlargement" sub-grammar.

It will thus be seen that the speech manager 6 selects for the speech recognition processing only the grammars or portions of the grammars that are related to the dialogue state of the machine as identified by the data accompanying the speech data to be processed. This restricts the selection of words and phrases available to the ASR engine 5 which should increase the efficiency of the speech recognition process and also should reduce the likelihood of ambiguous or incorrect results because words that are not relevant to the current dialogue state of the originating machine will not be contained in the grammar or sub-grammar accessible to the ASR engine 5.

Figure 22:
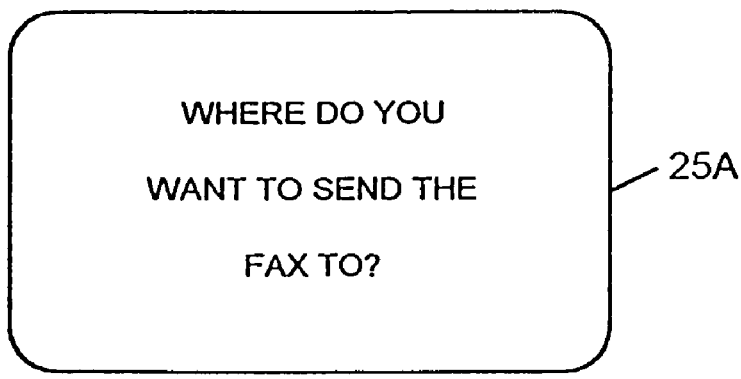
Figure 23:
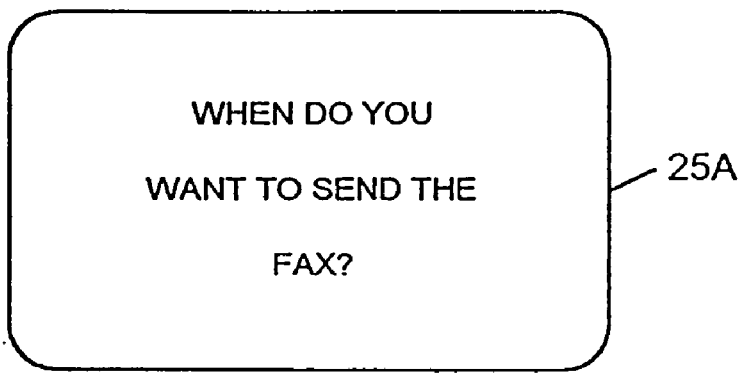
Figure 24:
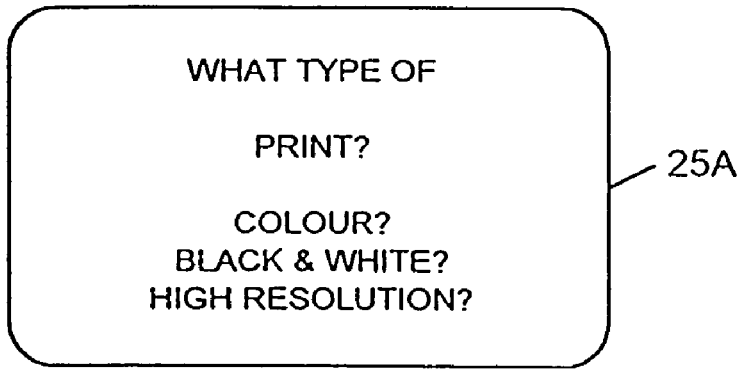

It will be appreciated that where the originating machine is the copier 9 or 10 rather than the multifunction machine 15, that the first screen shown to the user will be a screen corresponding to the screen 25A shown in FIG. 20 (not FIG. 19) and that the speech manager 6 will generally determine that the dialogue state is the copy dialogue state (step S122 in FIG. 16) from the machine identification.

Where the originating machine is the fax machine 11, then the screen 25A of the display will initially display to the user a message along the lines shown in FIG. 22 requesting the user to identify the destination to which the fax is to be sent. In this case, when the user responds by operating the speech activation switch 29 and speaking into the microphone "Please fax to Tom", then the speech manager 6 will determine at step S124 in FIG. 16 that the originating machine is a facsimile machine and will select the fax, shared words and time/date grammars, process the received speech data using the ASR engine 5 with these grammars and then interpret the results using the interpreter 7 as described above with reference to FIGS. 14 and 15 so as to return to the fax machine 11 device control commands instructing the fax machine to fax the message to the facsimile number associated with the mnemonic "Tom". In this example, the fax machine is capable of delayed transmission of facsimile messages and accordingly the main processor 20 will determine that the instruction input via the user is incomplete and will display on the screen 25A a message to the user requesting them to specify when they want to send the fax message (see FIG. 23). The speech operation processor 27 then enters an auxiliary dialogue state in which it is expecting a response identifying a time/date and any further speech input by the user is communicated to the network along with data identifying the speech data as being related to a "time/date dialogue state". Upon receipt of this speech data, the speech manager 6 will determine that the speech data should be interpreted using the time/date grammar and so will select only this grammar for use by the speech recognition engine 5. Once the meaning has been extracted from the speech data, the speech manager 6 controls the interpreter 7 to generate language independent device control commands corresponding to the time/date speech data and supplies these to the originating machine in the manner described above with reference to FIGS. 14 to 18.

The above description assumes that the machine originating the instructions is also the machine that will carry out the instructed function (that is one of machines 9 to 11 or 15 in FIG. 1). This will not be the case where the user is issuing instructions via the microphone of the digital camera or personal computer 12 or 13 to cause printing via the printer 14 (or the printing function of the multifunction machine 15).

As an example, assume that after activating the speech activation switch 29, a user of the digital camera 12 (or personal computer 13) says "Please print this in photoquality".

Upon receipt of the speech data representing this message (step S20 in FIG. 15), the originating machine will be identified using the start up grammar as the digital camera 12 and the speech manager 6 will select the print, shared names, time/date grammars and JINI look up service (steps S126 and S127 shown in FIG. 16). The ASR engine 5 will then, under the control of the speech manager 6, perform speech recognition in accordance with the selected grammars. If the user does not specify the type of print then the prompt shown in FIG. 24 may be displayed and further data awaited.

As noted above, the printer grammar optionally expects the information in the speech data identifying the type of printer. Where the network incorporates only one printer 14 as shown in FIG. 1, then the speech manager 6 will cause the JINI service object associated with that printer to be downloaded to the camera (or personal computer) as the default. However, where the network includes a number of different printers and the received speech data does not identify the printer then the speech operations processor 27 of the printer will cause the main processor 20 to display on the display 25 of the digital camera 12 (or the display of the personal computer 13) a message saying "Please select printer" (step S17 in FIG. 14). The speech operations processor 27 will then enter a printer select dialogue state and this dialogue state will be transmitted to the speech server together with any further spoken instructions input by the user so that when these further spoken instructions are received by the speech server, the speech manager will select the JINI look-up service grammar at step S129 in FIG. 16 and will cause an instruction to be sent to the JINI look-up service 16 to cause the service object for the printer specified in the further spoken instructions to be downloaded to the camera 12.

If the downloaded JINI service object determines that the information required to carry out printing is complete it sends the printer control commands together with the data to be printed to the required printer. If however the JINI service object determines at step S14 that the associated printer cannot produce the type of print required by the user, then the JINI service object will interrogate the JINI look-up service 16 to determine whether there is a printer available on the network that can print in accordance with the user's instructions and will advise the user accordingly (see steps S151 and S152 in FIG. 18).

Thus, in the present embodiment, because the speech operation processors 27 constitute JAVA virtual machines using the JINI facility, the fact that the machine at which the instructions are originated is not the machine at which the instruction will be carried out makes very little difference to the operation of the system. This is because the JINI service object for the or the requested printer will be downloaded to the JAVA virtual machine of the digital camera 12 or personal computer 13 so that the digital camera 12 or personal computer 13 can carry out steps S14 and S16 in FIG. 14 without the device control commands received from the speech server 2 having to be sent to the printer. Once the digital camera 12 or personal computer 13 determines using the downloaded JINI service object that the print instruction is complete at step S16 in FIG. 14, then the JAVA virtual machine constituting the speech operation processor 27 of digital camera 12 or personal computer 13 will send the print control commands together with the data to be printed to the required printer 14 at step S18 in FIG. 14.

Each of the above-described examples assumes that the user requires the requested function to be carried out immediately. This need not, however, necessarily be the case and the user may require, for example, that transmission of a facsimile message or printout of a document be deferred until a later time or date. For this reason, the fax and printer grammars both include optional time/data components determined in accordance with the rules stored in the common time/date grammar.

The time/date grammar is arranged to cooperate with the system clock and calendar of the network server and the speech server and, as mentioned above, uses built-in rules to interpret spoken words in accordance with the system clock and calendar.

Accordingly, if the user instructs the facsimile machine 11 to "Fax this to Tom at 10 am tomorrow", then this instruction will be interpreted in the same manner as the instruction "Fax this to Tom". However, in addition, the words "at 10 am tomorrow" will be interpreted by use of the fax and time/date grammars by the speech interpreter 7 to produce device control commands that will cause the fax machine 11 to defer transmission of the fax until the fax clock time that corresponds to "10 am tomorrow", provided that the machine ID store indicates that the facsimile machine 11 can perform delayed facsimile transmission.

If the speech manager 6 determines from the machine ID store 3 that the facsimile machine 11 does not have the facility for delayed or deferred transmission of facsimile messages, then a message to this effect may be displayed to the user at step S101 in FIG. 16. Alternatively, the speech server 2 may provide a data store where the facsimile message to be transmitted can be stored until the required time and then returned to the facsimile machine 11. It will, of course, be appreciated that a similar approach could be used to defer printing of documents until a specified time so that, for example, a user at a personal computer remote from the required printer can defer printing of the document until he can be present at the desired printer. Where this feature is available, then printing may be deferred until the user inputs a further command along the lines of "Please print job number . . . .". If the printer itself is provided with a microphone and the same speech operation processor software as the copying and facsimile machines 9 to 11, then this deferred print command could be input by the user at the printer so that the user can ensure that the document is not printed until he is actually present at the desired printer and has instructed its printing. This may be of particular advantage where the printer is located at some distance from the originating machine (digital camera or personal computer) and, for example, the user does not wish other people to view the document being printed.

Figure 25:
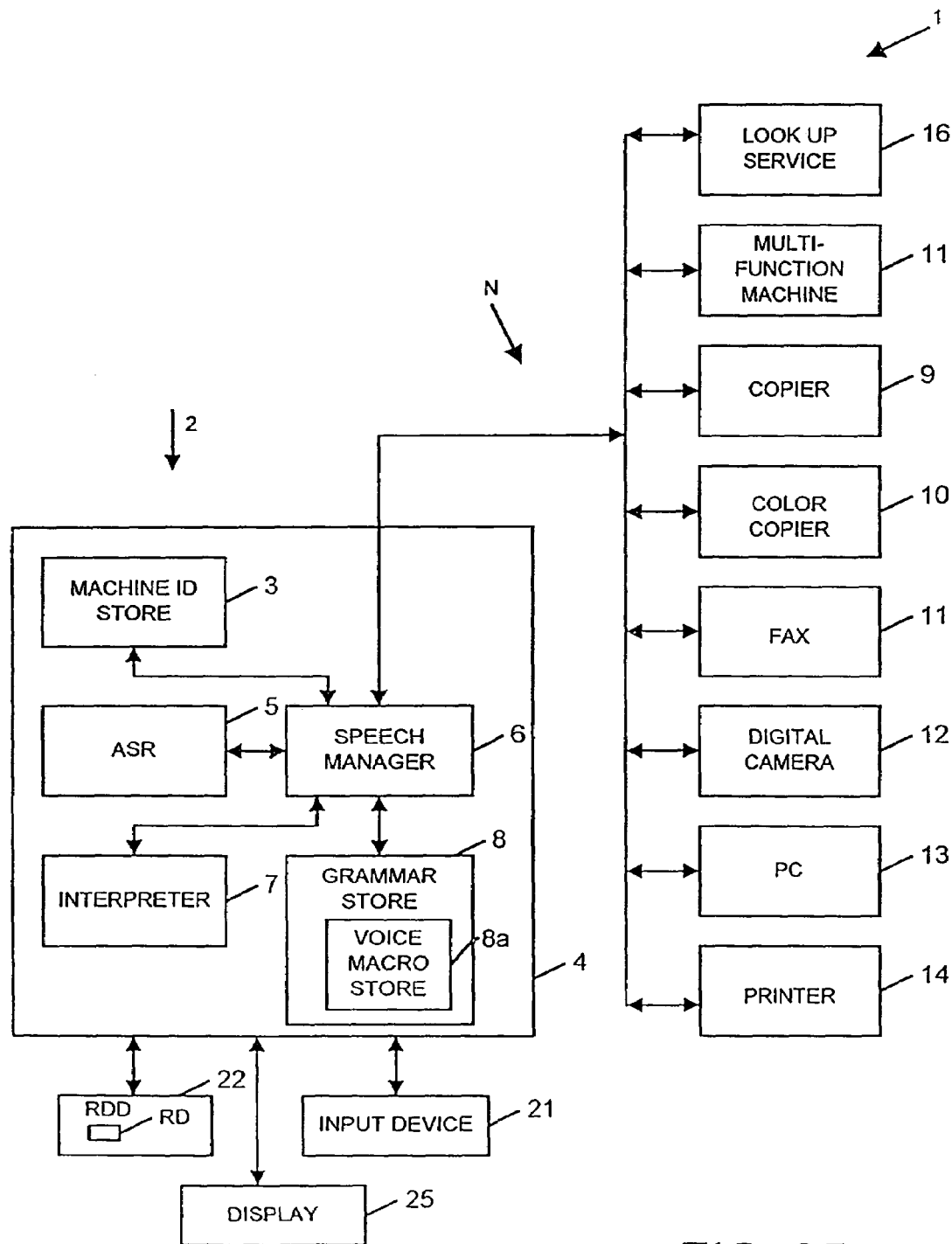
FIG. 25 shows a block diagram similar to FIG. 1 of a second embodiment of a system in accordance with the present invention.

FIG. 25 illustrates another embodiment of a system 1a in accordance with the present invention. The system 1a differs from the system 1 shown in FIG. 1 in that the speech server 2 also includes in the grammar store 8 a voice macro store 8a which includes voice commands defining specific instructions or instruction sequences. If these voice macros are specific to a type of machine, for example a copier, then they may be included in the copy grammar. However macros common to two or more types of machines will be stored in a shared voice macro store.

Where the machine is a copier, then voice macros such as "monthly report format", "house style" etc. may be defined at the speech server 2 so that every time a user requires a document to be in monthly report format or house style this can be achieved simply by the user saying "monthly report format" and the speech manager 6 will determine (when these words have been identified by the ASR engine 5) from the voice macro grammar what copier functions correspond to the voice macro "monthly report format", for example the voice macro "monthly report format" may correspond to the instruction 20 black and white copies, double-sided, collated and stapled. The speech interpreter 7 will then produce the device control commands required for the speech operation processor 27 of the originating copier 9 or 10 to cause the copier to produce copies in accordance with the required monthly report format. This central or shared storage of voice macros means that modifications or updates of standard copying styles can be effected and it is not necessary for each individual user to know the details of the current format but simply that the format exists. Voice macros may similarly be stored for different printing styles for different documents defining, for example, the print quality and number of copies and voice macros may also be provided for the facsimile machine so that where documents are frequently faxed to a group of people at different facsimile numbers, the voice macro to "fax to set 1" will be interpreted as requiring the same document to be faxed to each of the facsimile numbers in set 1.

The functioning of the apparatus shown in FIG. 25 differs from that described with reference to FIG. 1 in that the speech manager 6 will select the voice macro grammar as well as the basic (copy, fax, print) grammar. Of course, where the voice macro grammar is embedded in the corresponding one of the other grammars then the voice macro grammar will automatically be selected. Otherwise the operation of the system is the same.

In the above-described embodiments, a single ASR engine 5 which is not trained to any particular person's voice or speech is used. The speech server 2 may, however, store a number of different ASR engines each trained to a particular person's voice or speech. In this case, the grammar store 8 would also include a voice grammar associating each ASR engine with a particular user and including words and grammar rules that may be used to identify that user. In such a case, where, for example, the user wishes to produce copies at the photocopier 9, then the user may say "This is John. Please make two copies double-sided". In this case once the speech data is received by the speech manager 6, the speech manager 6 will select the grammar for the originating machine as described above (step S21 in FIG. 15) but will also select the voice grammar. The speech manager 6 then causes, at step S900 in FIG. 26, a default ASR engine to perform preliminary speech recognition with the help of the voice grammar so as to determine whether any of the words spoken by the speaker (the word "John" in the above example) identify that speaker as a person for whom the speech server 4 has access to a trained ASR engine.

Figure 26:
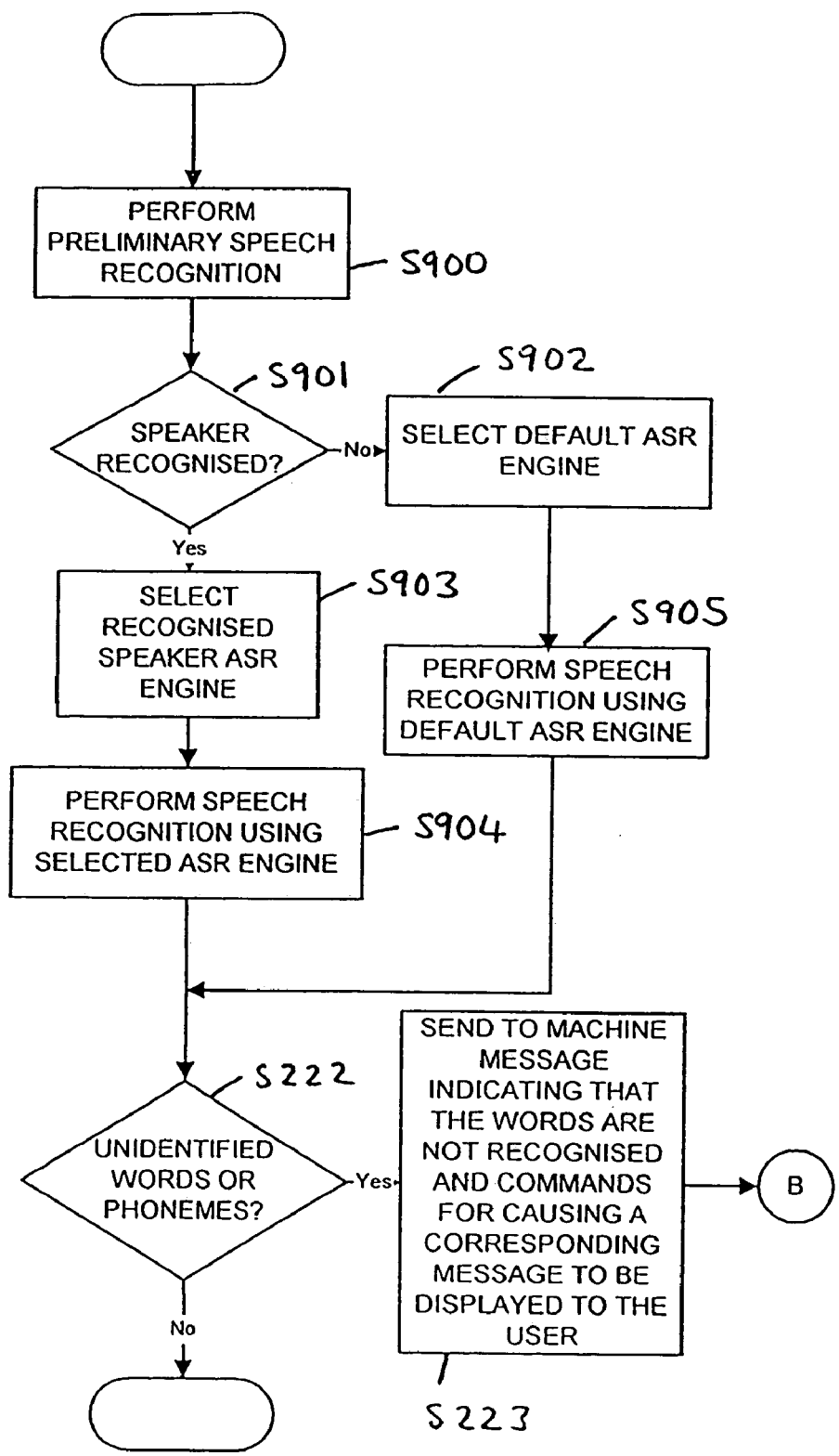
FIG. 26 shows a flowchart for illustrating another way of performing speech recognition using the system shown in FIG. 1 or FIG. 25.

If at step S901 in FIG. 26 the speech manager 4 determines that the speaker has been recognised, then the speech manager selects at step S903 the ASR engine associated with that particular speaker and then performs speech recognition using the selected ASR engine at step S904. If the answer at step S901 is no and the speaker is not recognised, then a default ASR engine is selected at step S902 and then speech recognition is performed using the default ASR engine at step S905. Once either speech recognition engine has completed its task, the speech manager 6 determines whether there are any unidentified words or phonemes at step S222 and, if so, sends the required message at step S223 and then returns to point B in FIG. 15. Otherwise the speech manager 6 proceeds to step S23 in FIG. 15.

Figure 27:
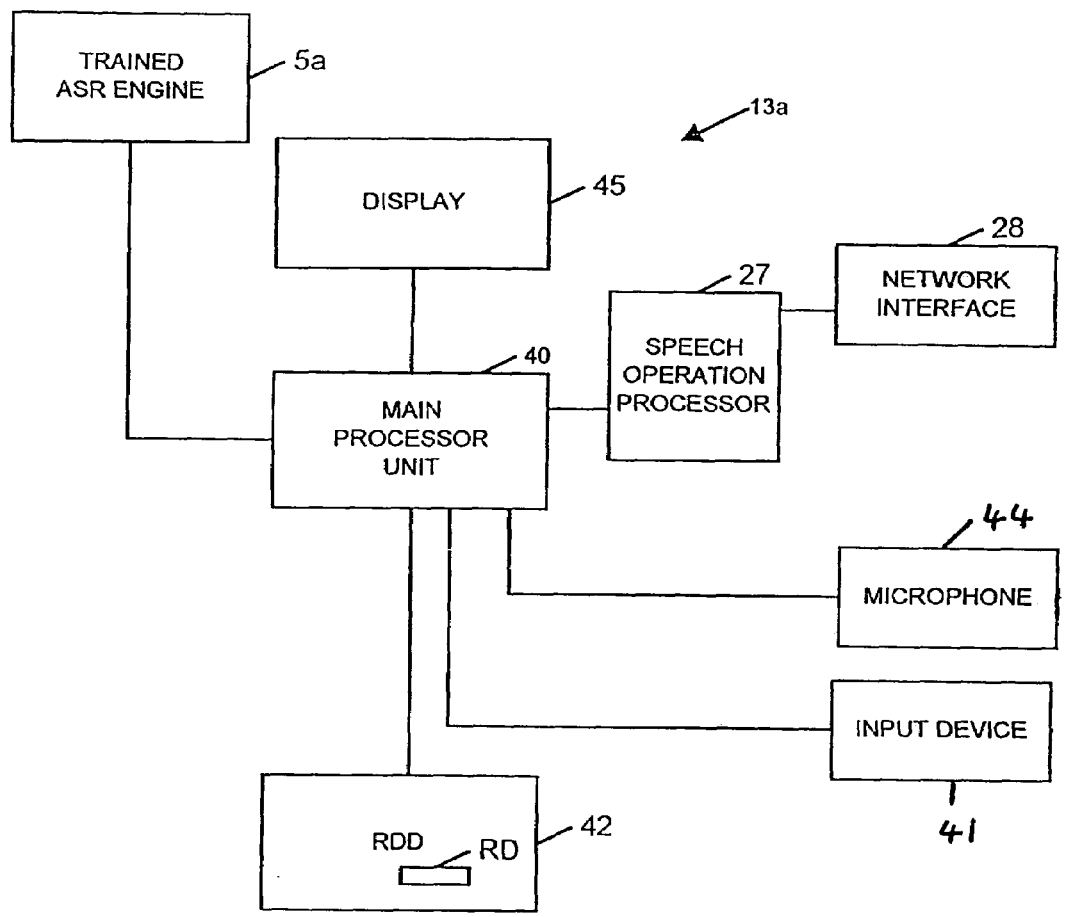
FIG. 27 shows a block diagram of a modified personal computer suitable for use in the system shown in FIG. 1 or FIG. 25.

The trained ASR engines 5 may be stored at the speech server 4 or may be located on individual personal computers connected to the network. FIG. 27 shows a block schematic diagram of a modified personal computer 13a which also includes software defining a trained ASR engine 5a. Where the trained ASR engines 5a are located on personal computers 13a, then, of course, the voice grammar will include the necessary information for the speech manager 6 and interpreter 7 to download or access the required ASR engine over the network N.

Where the network is such that individual personal computers, copiers, fax machines and digital cameras are each primarily used by a particular different individual, then this information may be included in the machine ID store 3 so that the speech manager 6 can identify the most likely user of the machine from the identity of the machine being used. In such circumstances, of course, step S900 in FIG. 26 will be omitted and step S901 of recognising the speaker will be carried out on the basis of the identified machine and its association with a particular individual rather than on the words spoken by the individual user.

Figure 28:
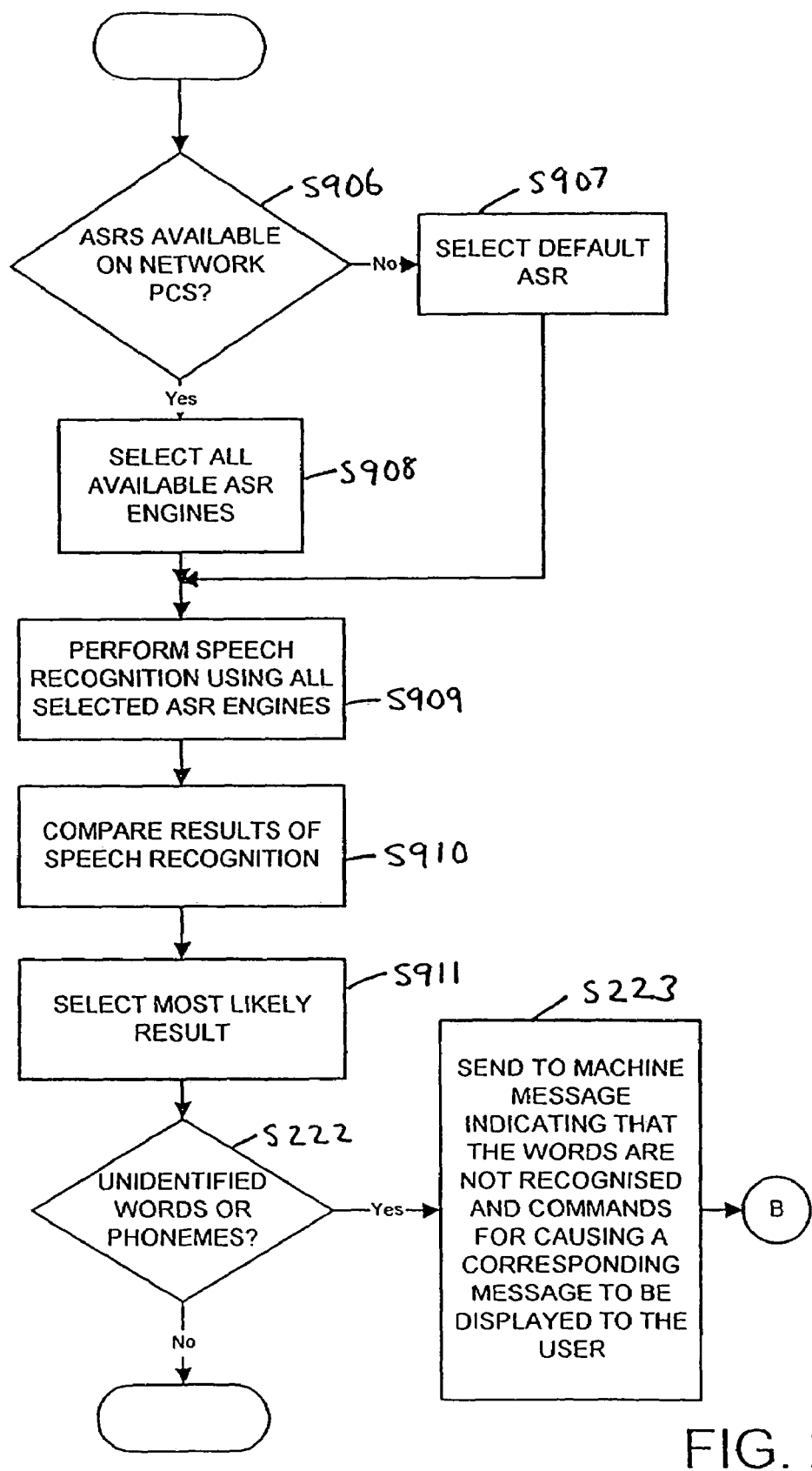
FIG. 28 shows a flowchart for illustrating a modified way of performing speech recognition using the speech server of the system shown in FIG. 1 or 25.

Even where the individual user of a machine cannot be identified, using a number of different ASR engines and comparing the results of the speech recognition performed by those different ASR engines may increase the reliability of the speech recognition. As described above, these different ASR engines may be located at the speech server or distributed between different personal computers connected to the network. FIG. 28 shows a flowchart for illustrating the process of performing speech recognition where a number of different ASR engines may be available.

In this case, once the speech manager 6 has received the speech data and has selected the appropriate grammars (for example the copy and shared words grammars for a photocopier), the speech manager 6 checks at step S906 in FIG. 28 whether there are ASR engines available on personal computers connected to the network. If the answer at step S906 is no, then the speech manager 6 selects the speech server ASR engine 5 as the default at step S907.

If the answer at step S906 is yes, then the speech manager 6 selects all currently idle ASR engines connected to the network at step S908 and uses, at step S909, each of these ASR engines to perform speech recognition on the received speech data. The speech manager then compares, at step S910, the results of the speech recognition carried out by each of the selected ASR engines and selects, at step S911, the most likely result. This may be achieved by, for example, using a voting scheme so that the most commonly occurring word or words in the speech recognition results are determined to be the most likely spoken words or a confidence scheme based on the confidence scores provided as part of the ASR engines may be used. Steps S222 and S223 then proceed as described above with reference to FIG. 17.

Figure 29:
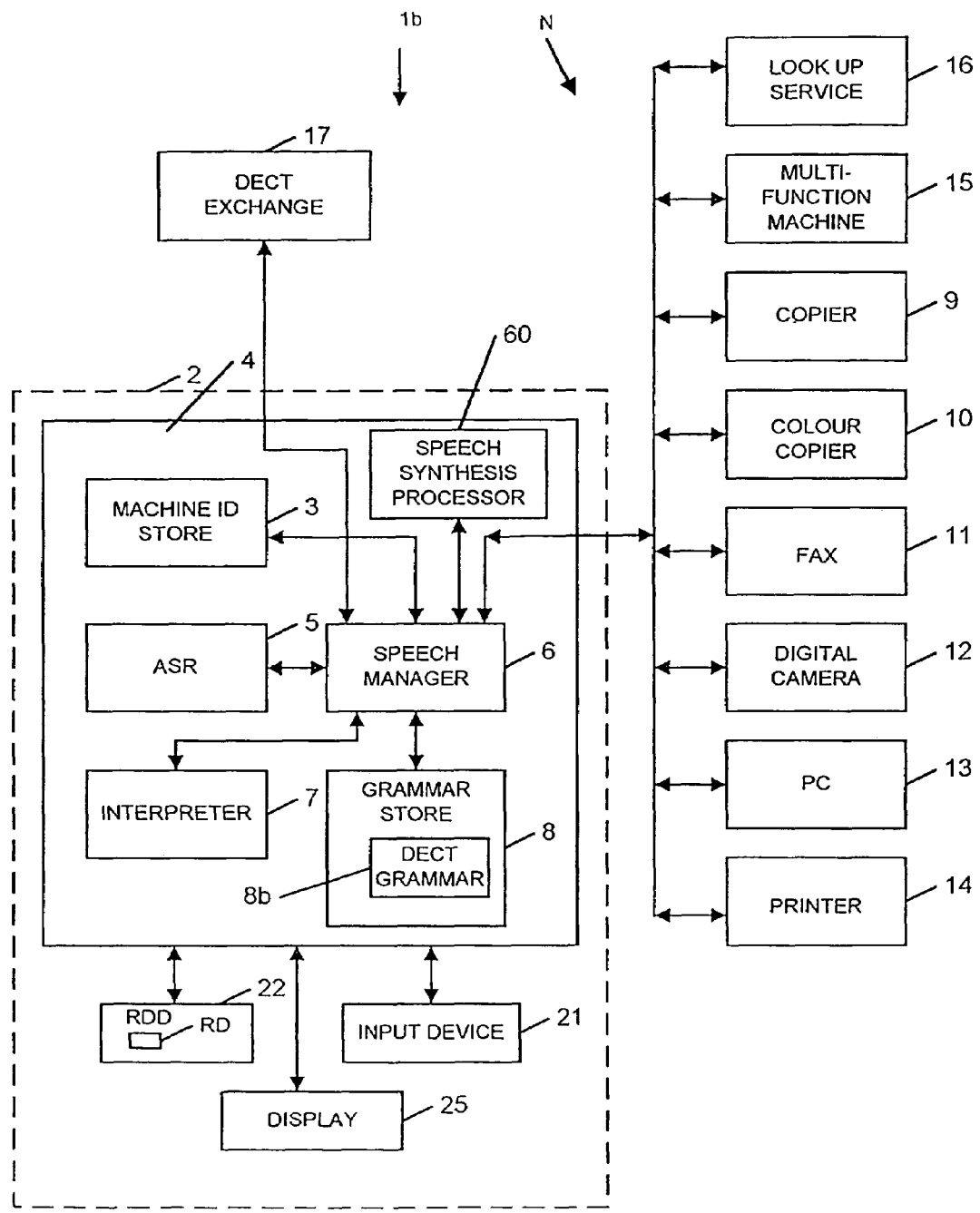
FIG. 29 shows a block diagram illustrating another embodiment of a system in accordance with the present invention.

Each of the embodiments described above requires the machine to which spoken instructions are to be input to be provided with its own microphone. FIG. 29 illustrates another embodiment of a system 1b in accordance with the present invention wherein the speech server 2 is coupled to the internal exchange 17 of a digital enhanced cordless telecommunications (DECT) internal telephone network.

Figure 30:
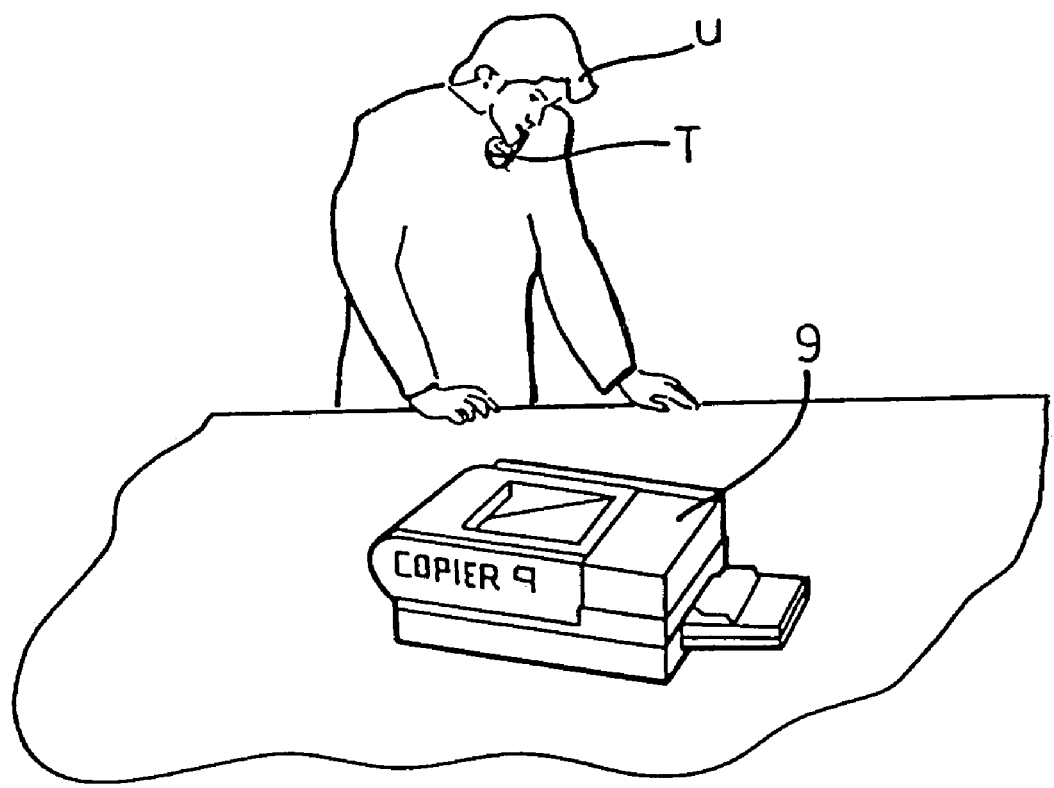
FIG. 30 shows diagrammatically a user issuing instructions to a machine of the system shown in FIG. 29.

In this embodiment, a user may input instructions to one of the machines 9, 10, 11, 12 or 13 using his DECT mobile telephone. FIG. 30 illustrates schematically a user U instructing the copier 9 to produce copies using a DECT mobile telephone T.

Each mobile telephone on the DECT exchange will normally be used only by a specific individual. That individual may, however, be located adjacent to any one of the machines coupled to the network when the speech server 2 receives instructions via the DECT exchange 17.

It is therefore necessary for the speech server 2 to be able to identify the location of the DECT mobile telephone T (and thus the user) so that the speech server 2 can determine which of the machines 9 to 13 or 15 is receiving instructions from the user. It may be possible to determine the location of the mobile telephone from the communication between the mobile telephone and the DECT exchange 17. However, in this embodiment, each of the machines coupled to the network is given an identification. Thus, as shown in FIG. 30, the copier 9 carries a label identifying it as "copier 9".

In this embodiment, the grammar store 8 also includes a DECT grammar 8b which includes rules specifying the structure of phrases that the user can input using his DECT telephone to identify the machine at which he is located together with the words that may be used to input those instructions. For example, the DECT grammar may allow phrases such as "I am at copier number 9" or "This is copier number 9".

Operation of the system 1b shown in FIG. 29 differs somewhat from that shown in FIG. 1. Thus, in this embodiment, the user issuing instructions via his DECT telephone first of all has to identify the machine at which he is located. Accordingly, the initial dialogue state for instructions issued using the DECT telephone will be a "DECT dialogue state" (that is one of the other dialogue states at step S128 in FIG. 16) and accordingly initially the speech manager 6 will select the DECT grammar 8b so that the ASR engine 5 can interpret the words spoken by the user in accordance with the DECT grammar 8b so as to enable the speech manager 6 to identify the originating machine. Once the originating machine has been identified, then the speech server 2 will send control commands to the machine at which the DECT telephone is located in the manner described above with reference to FIGS. 19 to 24 so that the display 25 of the originating machine displays to the user a message prompting the user to input further information. Where, as shown in FIG. 30, the user is determined to be located at the copier 9, then the screen shown in FIG. 20 will be displayed to the user. The user may then input further instructions using the DECT telephone or the control panel of the machine and processing of those instructions will proceed as described above with reference to FIGS. 14 and 15.

Although providing prompts and requests for further instructions to the user via the display is straightforward, it may be more convenient for the user to receive prompts or further instructions via his DECT telephone. Accordingly in a modified form of the system 1b the speech manager 6 is associated, as shown in FIG. 29, with a speech synthesis processor 60. In this modified embodiment, when the speech manager 6 determines that a prompt needs to be sent to the user, instead of sending instructions over the network N to the speech operation processor of the originating machine to cause the associated main processor to display the appropriate message on its display 25, the speech manager 6 sends the text of the prompt to the speech synthesis processor 60 which generates the equivalent spoken form of the text and then transmits this to the user via the DECT exchange 17. The use of the DECT mobile telephone system to send prompts and requests for further instructions to the user has the advantage that it is not necessary to use a display present on the originating machine and, for example, the system may be used where the originating machine has no or a very small visual display, as may be the case for the digital camera 12.

Operation of the system 1b where prompts and requests for further instructions are sent to the user via the DECT telephone system is similar to that described above except that messages such as those shown in FIGS. 19 to 24 will be given to the user orally over the telephone system rather than visually via the display of the originating machine.

The system shown in FIG. 29 may be adapted for use with a conventional fixed line internal telephone exchange and that, if each of the machines on the network is located adjacent to a specific fixed location telephone, then it will be possible to identify the location of a user automatically so that it is not necessary for the user to identify the machine from which he is issuing instructions.

Although the system 1b shown in FIG. 29 enables the need for microphones and speech processing software at the machines 9 to 13 and 15 to be avoided, it is still necessary for these machines to incorporate a modified form of the speech operation processor 27 to enable device control commands to be received from the speech server 7 and processed to provide the main processor 20 with commands that emulate the commands that would have been provided if the manual control panel 24 had been used. The need for the speech operation processors 27 could be removed entirely if the interpreter 7 was programmed so as to supply to each of the machines 9 to 12 and 15 device control commands that directly emulate the device control commands that would have been supplied to the machine via the control panel. This would mean that the only modification required of these machines to enable speech controlled operation would be to modify the main processor and its operating software so as to enable it to take control commands from the network as well as the control panel.

The system 1b shown in FIG. 29 enables oral prompts and requests for further information to the user. The system 1 shown in FIG. 1 and the system 1a shown in FIG. 25 may also be modified to enable oral prompts to the user by providing each of the machines with a loudspeaker and providing speech synthesis software either in the speech operations processor 27 of the individual machines or at the speech server 2 by incorporating in the speech server 2 a shared speech synthesis processor 60 as shown in FIG. 29.

The system 1b has particular advantages where ASR engines trained to the voice of particular users are available to the speech server 2. Thus, where the DECT telephone system is used to input instructions, then it will not generally be necessary to perform the preliminary speech recognition step S900 shown in FIG. 26 because the speech manager 6 will be able to identify the speaker from the identity of the DECT mobile telephone because, as mentioned above, each DECT mobile telephone will be associated with a particular user.

In each of the embodiments described above, the speech operations processor 27 forms a JAVA virtual machine and uses the JINI facility of the JAVA platform. It is, however, not necessary to use the JAVA platform and other platforms that provide similar functionality may be used.

The present invention may also be implemented using operating software and platforms that do not provide the functionality of the JAVA and JINI systems described above. In such cases, it should still be possible to use the look-up service 16 described above but entry of information into this look-up service may need to be carried out by, for example, a manager of the network.

As described above, the JINI service objects enable the digital camera 12 or personal computer 13 to determine whether the printer 14 is capable of acting in accordance with the device control commands received back from the speech server.

Figure 31:
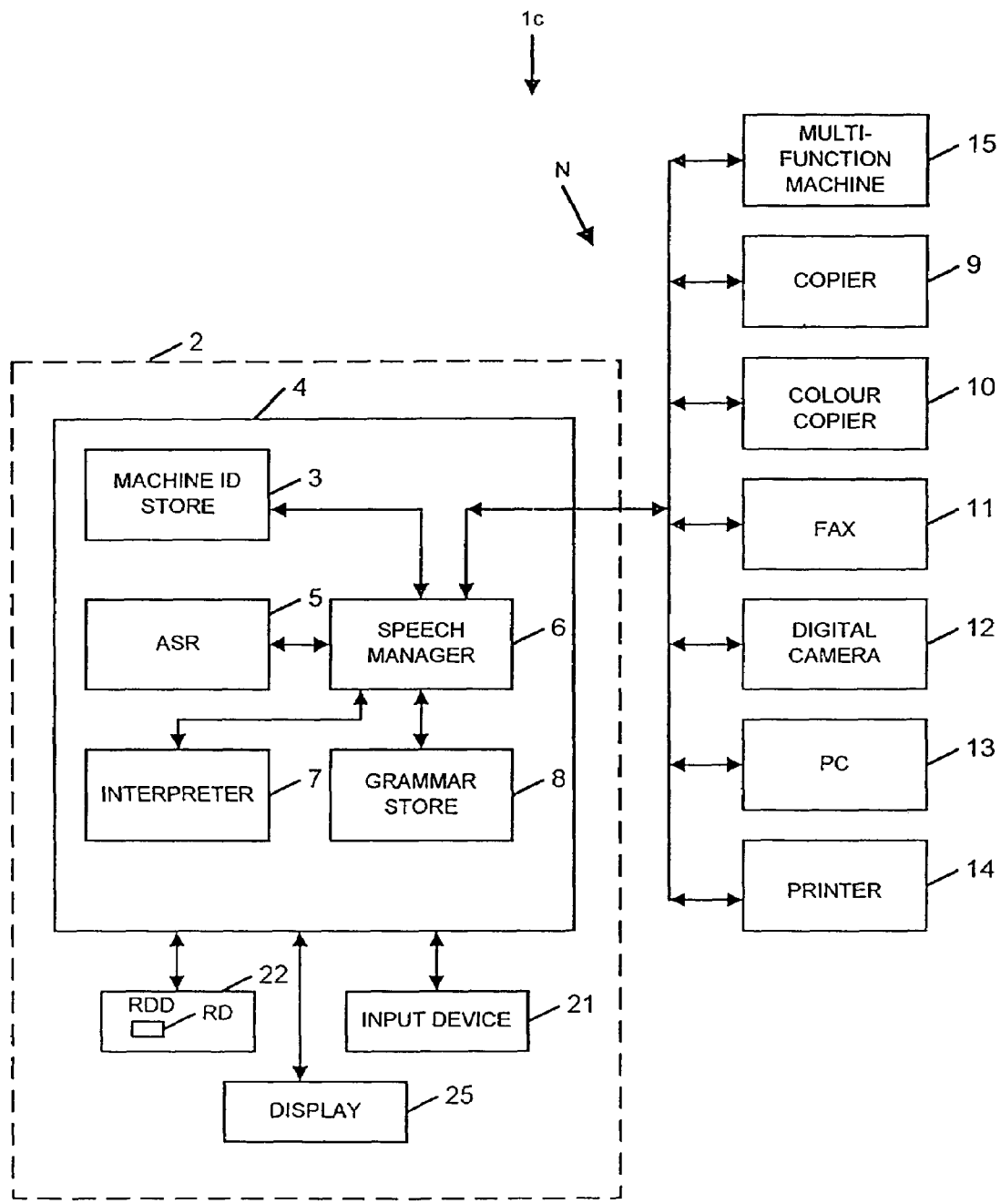
FIG. 31 shows a schematic block diagram of another embodiment of a system in accordance with the present invention.

FIG. 31 illustrates a modified system 1c which does not have the functionality of the JINI service object. This system also does not include the look-up service 16. Otherwise, this embodiment is similar to that shown in FIG. 1.

Figure 32:
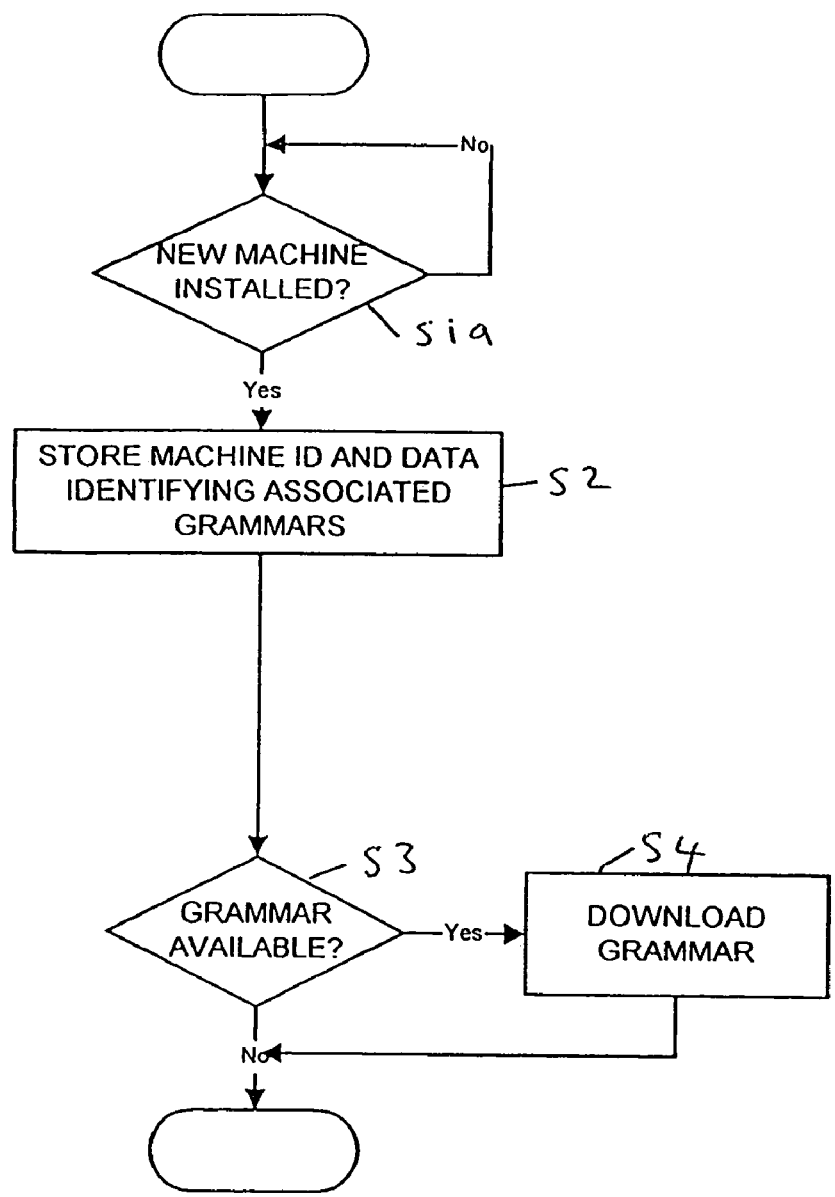
FIG. 32 shows a flowchart for illustrating installation of a machine onto the network of the system shown in FIG. 31.

FIG. 32 illustrates the installation of a new machine onto the network N of the system 1c. In this case, installation of a new machine at step S1a is not automatic and it is necessary for the network manager to install the new machine onto the network in conventional manner and then to ensure at step S2 that the machine is provided with or supplies to the speech server 2 a machine identification and data identifying the associated grammars. Once the machine has been installed on the network N it may communicate automatically with the speech server 2 so that the speech server can determine whether there are new grammars or grammar updates available at step S3 and, if so, can then download these grammars or updates at step S4 in a manner similar to that described above with reference to FIG. 12.

Figure 33:
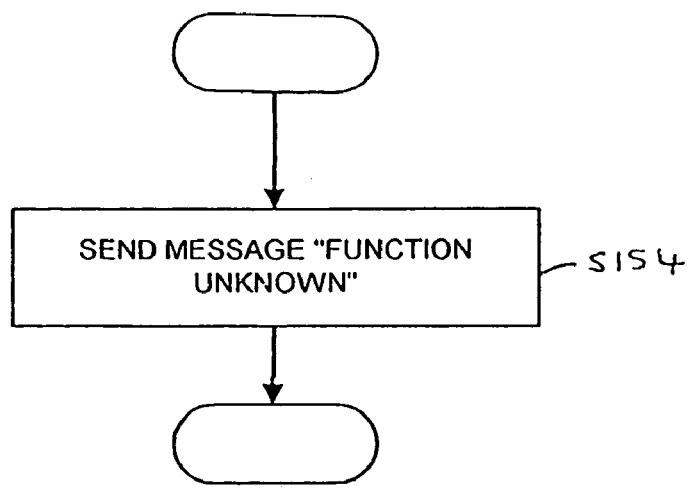
FIGS. 33 and 34 show different ways in which a user may be informed that the requested function cannot be carried out in the system shown in FIG. 31.
Figure 34:
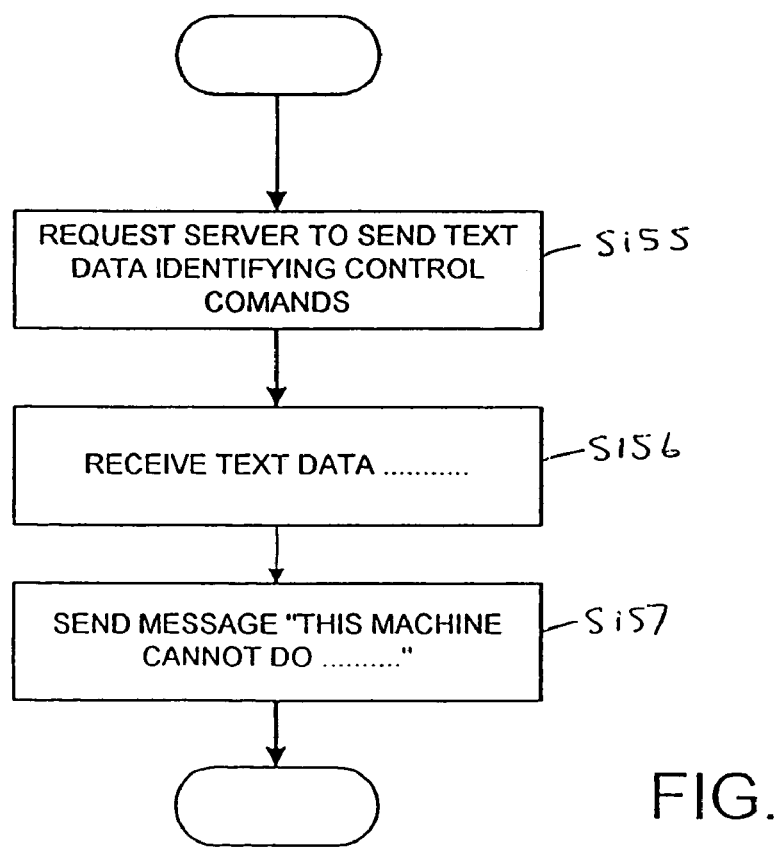

Operation of the system 1c shown in FIG. 31 will depend on whether or not the machine to which instructions are input (the originating machine) is the same as the machine which is to carry out the instructions. This is the case for, for example, the copier 9 or 10, the facsimile machine 11 and the multifunction machine 15 when acting as a copier or facsimile machine. In these cases, the operation of the system 1c is as described with reference to FIGS. 14 to 17. However, when the answer at step S14 in FIG. 14 is no it is not possible for the user to be advised of a machine that can carry out this function, because the look-up service 16 is not available. Instead, the steps carried out by the speech operation processor 27 at step S15 in FIG. 14 may simply be, as shown in FIG. 33, the step S154 of sending to the user a message along the lines of "Function unknown" or "Function unrecognised". Alternatively, when the machine determines that it does not recognise the received control commands, then the machine may send a request to the speech server 2 to send text data identifying the unknown command at step S155 in FIG. 34 and, once that text data is received at step S156, the speech operations processor 27 will cause the main processor 20 of the machine to give the user the message "This machine cannot do . . . .". For example, where the machine is a copier that cannot do colour copies, then the speech server will send back text data representing the words "colour copies" and the message displayed to the user will be: "This machine cannot do colour copies".

As a further alternative, text data corresponding to the device control commands may be sent automatically by the speech server 2 so that when the machine determines that it does not recognise the received commands at step S14 it can simply retrieve the accompanying text data and give the appropriate message to the user.

Figure 35:
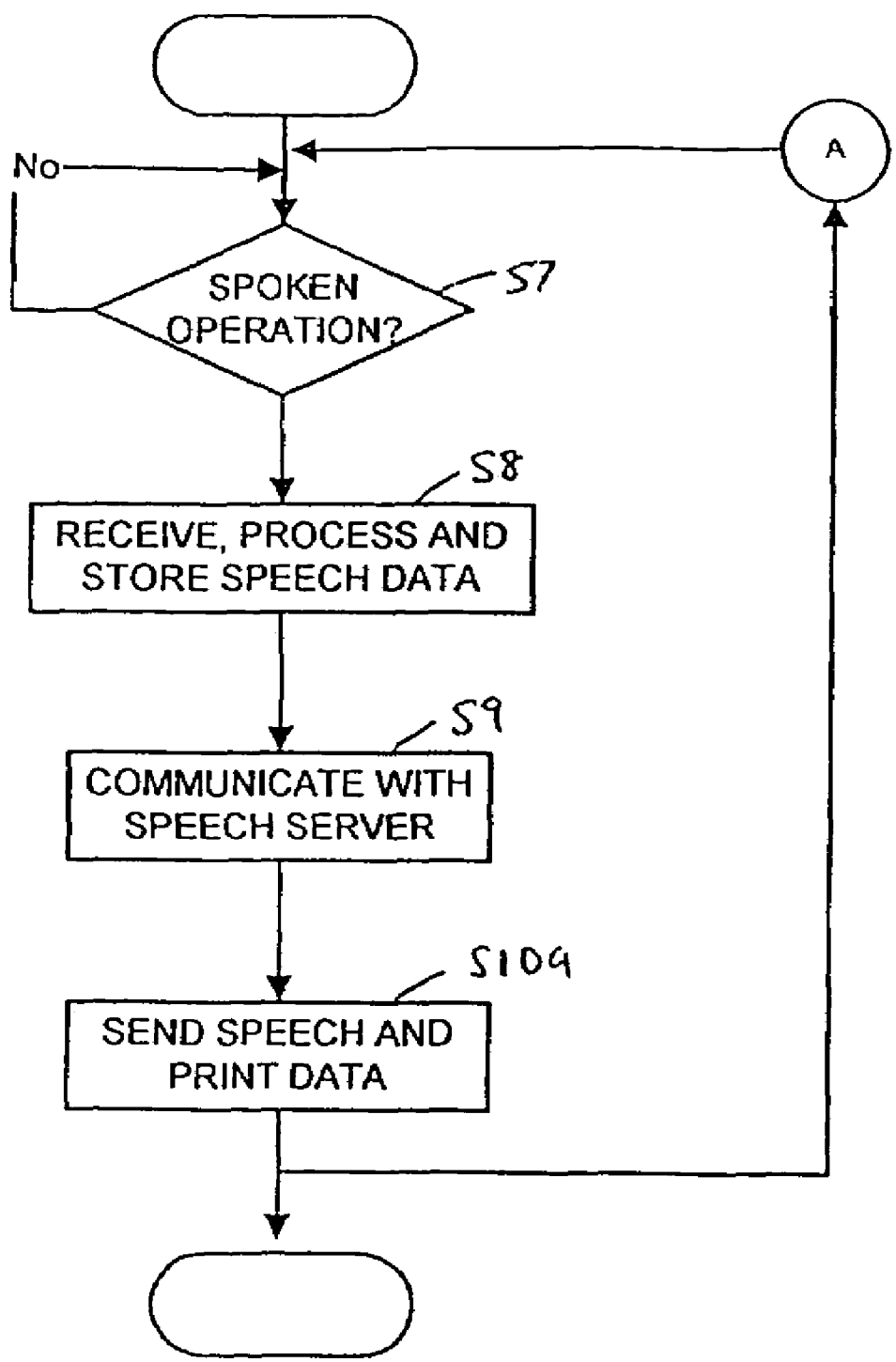
FIGS. 35 and 36 are flowcharts for illustrating one mode of operation of the system shown in FIG. 31.
Figure 36:
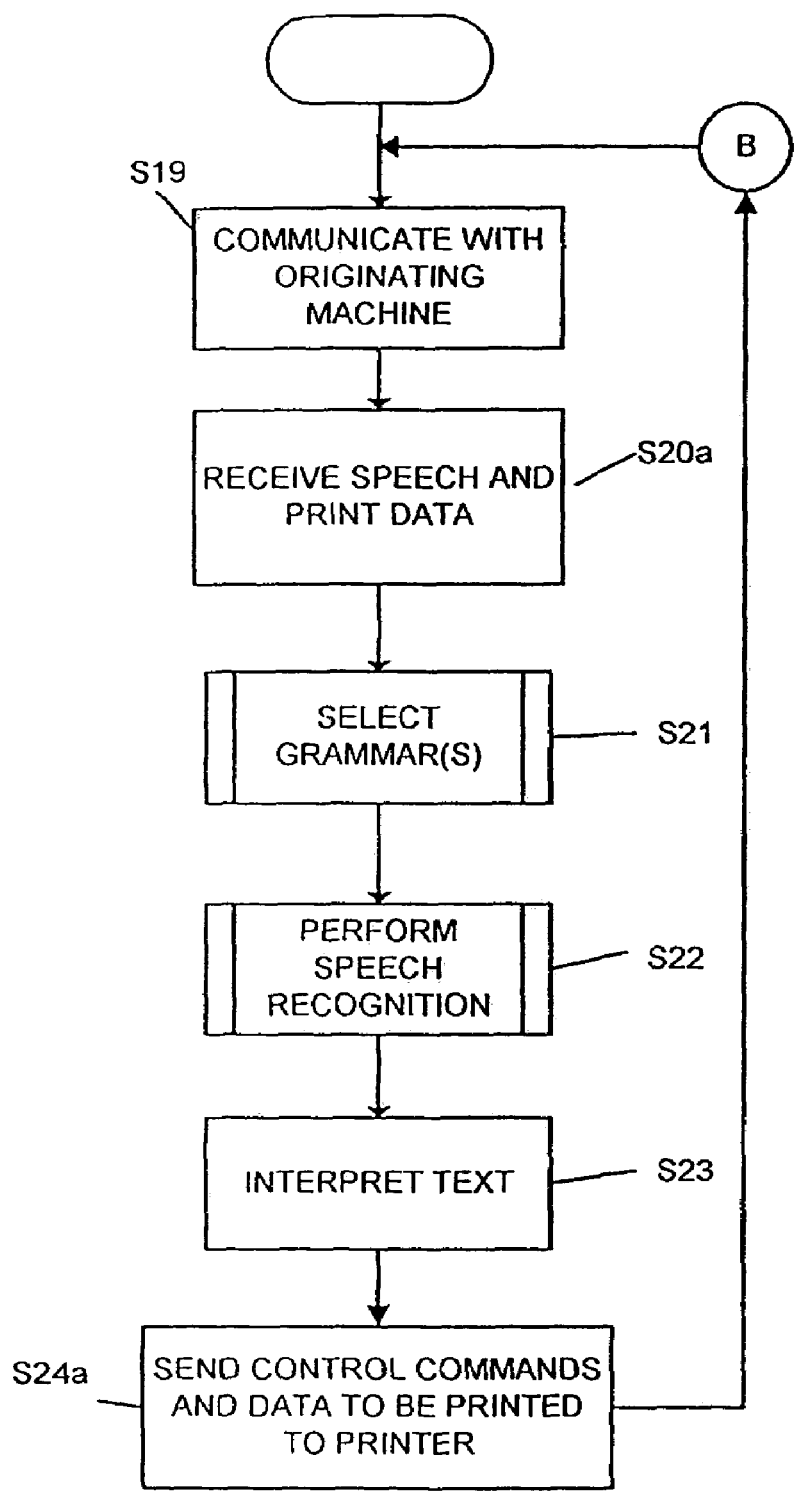

FIG. 35 is a modified form of the flowchart shown in FIG. 14 to illustrate the operations of the originating machine when that machine does not itself carry out the requested function (for example where the originating machine is the personal computer or digital camera). As can be seen from FIG. 35, in this case the originating machine carries out steps S7 to S9 in the same manner as described above with reference to FIG. 14. However, at step S10a, instead of just sending the speech data to the speech server, the originating machine also sends the data to be printed. FIG. 36 illustrates the corresponding modifications to the flowchart shown in FIG. 15. Communication with the originating machine is carried out at step S19 as described above. At step S20a the speech server 2 receives the speech data together with the data to be printed. Steps S21 to S23 are then carried out as described with reference to FIG. 15, and then, at step S24a, the speech server 2 sends the device control commands and the data to be printed to the printer to cause the printer to print in accordance with the instructions received from the user. Although this arrangement enables instructions to be input to the digital camera 12 or personal computer 13 to control operation of the printer without the use of JINI service objects, it has the disadvantages that there is no possibility of feedback to the user so that if the printer cannot carry out the requested task, it simply produces an error message and that it is necessary for the data to be printed to be transmitted to the speech server and stored at the speech server for subsequent transmission to the printer together with the printer device control commands. This inevitably increases the traffic on the network and the amount of memory storage required by the speech server.

It will be appreciated that the speech server 2 may also use the information in its machine ID store regarding the other machines on the system (that is the copiers and fax machines) so that the speech server 2 rather than the machine itself can determine whether the machine is capable of carrying out the function requested by the user.

With the exception of the printing process described with reference to FIGS. 35 and 36, in the above-described embodiments, a dialogue occurs with the user so that the user is advised where the machine cannot carry out the requested function and is prompted for further instructions when the instructions are incomplete. The present invention may, however, be applied to a system where this facility is not available so that the system responds to a single input instruction by the user and, if the instruction is not understood or the machine cannot carry out the requested function, the user is simply provided with an error message. So that, for example, where the user of the copier 9 issues the instruction "Please copy this", the speech server 2 simply causes the ASR engine 5 to perform speech recognition on this instruction using the copier related grammars from the grammar store 8 and then supplies the appropriate language independent device control commands produced by the interpreter 7 to the copier 9 which, if it understands the received commands, will perform a print operation or otherwise will just issue an error signal. Although such a system should be more simple in operation, it has the disadvantage that the user is provided with no feedback or assistance by the system.

In each of the embodiments described above, the grammars include rules that determine the structure of valid phrases that can be input as instructions. As an alternative, the grammars may simply include different categories of words that may be expected. For example, in the case of the copy grammar, the copy grammar may include a "action or instruction category" in which words such as copy, make copies, copies, reproduced etc. will be included, a "copy feature" or "manner" section or category in which words such as single-sided, double-sided, reduced, colour etc. will be included and so on. Although such grammars would be more flexible in allowing the user to input instructions in any structure or order, because the structure or order of valid instructions is not constrained, the possibility of misinterpretations and errors will be increased with there being a greater likelihood of confusion between similar words such as "to", "two" and the meaning of the same word in different senses.

In the embodiments described above, it is assumed that the components additional to the conventional components of the machines 9 to 14 form an integral part of that machine. However, these components may be provided as a separate unit connectable to the main processor 20 of the machine via a linking cable and an appropriate standard interface so that machines such as the copiers 9 and 10, the facsimile machine 11 and the digital camera 12, may be provided both with and without the facility for speech control of their operation. Such a modification may also be implemented in the system shown in FIG. 29 although, in this case, the microphone and input speech processing circuitry will in any case already be separate as they are provided by the telephone system.

In each of the embodiments described above, the speech data may be compressed for transmission to the speech server 2. Generally, the compression algorithm used will be a compression algorithm that compresses the speech data in a manner adapted for the speech recognition engine. Such compression algorithms are known in the art. In the embodiments described above, where use is made of the JAVA/JINI platform then a JINI service object can be used to download to the originating machine the correct speech compression algorithm for the ASR engine to be used for the speech recognition at the speech server.

In the above described embodiments, the speech server 2 is the only server on the network N. The speech server may however be dedicated solely to the speech data processing tasks discussed above and a further server or servers may be provided to carry out any other network functions. As discussed above, the network may be any arrangement that enables communication between machines that are physically located in different parts of a building or in different buildings and there need be no network functions to be carried out other than the speech data processing discussed above.

In the above embodiments, the machines 9 to 15 all form pieces of office equipment. The present invention may, however, be applied to the control of other items of equipment connected over a network such as computer controlled items of machinery and/or computer controlled domestic equipment such as video recorders etc.

Other modifications will be apparent to those skilled in the art.

What is claimed is:

1. A system for enabling a user to control operation of a networked machine by issuing a spoken instruction, the system comprising:
   a plurality of processor-controlled machines couplable to the network, each processor-controlled machine being capable of carrying out at least one function and each processor-controlled machine having control command receiving means for receiving control commands over a network, and function actioning means for causing a function specified by received control command data to be carried out;
   speech data receiving means for receiving speech data representing speech spoken by a user;
   a spoken instruction interpreting apparatus couplable to the network, the spoken instruction interpreting apparatus having processor-controlled machine identifying means for identifying the one of the plurality of processor-controlled machines that the user wishes to control, accessing means for accessing speech recognition means to cause the speech recognition means to perform speech recognition processing on speech data received by the speech data receiving means to produce recognised speech data, processing means for processing recognised speech data received from the speech recognition means to derive from the recognised speech data control command data for controlling the identified processor-controlled machine, and control command data transmitting means for transmitting the derived control command data over the network to the identified processor-controlled machine to enable the function actioning means of the identified processor-controlled machine to cause the function specified by the user's spoken instruction to be carried out;
   look-up means for storing information relating to the functions capable of being carried out by processor-controlled machines coupled to the network;
   determining means for determining whether the identified processor-controlled machine can carry out the function specified in a spoken instruction; and
   advising means for advising the user, on the basis of the information stored in the look-up means, if there is another processor-controlled machine coupled to the network that can carry out the function specified in a spoken instruction if the determining means determines that the identified processor-controlled machine cannot carry out the function.

2. A system according to claim 1, wherein the spoken instruction interpreting apparatus has a grammar store which defines at least one of words and phrases that can be used in spoken instructions.

3. A system according to claim 2, wherein at least one of the plurality of processor-controlled machines is capable of carrying out different functions and wherein the grammar store stores a respective grammar for each different function.

4. A system according to claim 3, wherein the grammar store stores a shared grammar containing words common to instructions relating to the different functions.

5. A system according to claim 1, wherein the spoken instruction interpreting apparatus has a grammar store storing rules determining the structure of phrases that can be used in spoken input instructions.

6. A system according to claim 1, wherein the spoken instruction interpreting apparatus has a grammar store storing rules determining the structure of phrases that can be used in spoken instructions and a vocabulary of words that can be used in those phrases.

7. A system according to claim 1, wherein at least one of the plurality of processor-controlled machines is capable of carrying out different functions.

8. A system according to claim 7, wherein the different functions comprise photocopying, facsimile transmission and printing.

9. A system according to claim 1, wherein the plurality of processor-controlled machines comprises a plurality of different types of processor-controlled machine, each different type being capable of carrying out a different function.

10. A system according to claim 1, wherein speech data receiving means and speech data transmitting means are associated with each of the plurality of processor-controlled machines.

11. A system according to claim 10, wherein the speech data receiving means and speech data transmitting means form part of the associated processor-controlled machine.

12. A system according to claim 1, wherein the speech data receiving means and speech data transmitting means are associated with an additional processor-controlled machine coupled to the network.

13. A system according to claim 12, wherein the additional processor-controlled machine is a personal computer or a digital camera and at least one of the plurality of processor-controlled machines comprises a printer.

14. A system according to claim 1, wherein the plurality of processor-controlled machines comprise:
an instruction originating processor-controlled machines coupled to the network, having means for receiving speech data representing instructions spoken by a user of the machine and means for transmitting the speech data over the network to the spoken instruction interpreting apparatus; and
an instruction receiving machine coupled to the network, having means for receiving control commands over the network from the spoken instruction interpreting apparatus and means for causing the instruction receiving machine to act in accordance with the control commands whereby, in use, the instruction receiving machine is caused to carry out the function specified in the instructions spoken by the user of the instruction originating machine.

15. A system according to claim 1, wherein the speech data receiving means comprises a telephone system coupled to one of one of the plurality of processor-controlled machines and the spoken instruction interpreting apparatus.

16. A system according to claim 15, wherein the telephone system comprises a cordless telephone system.

17. A system according to claim 16, wherein the telephone system comprises a DECT telephone system.

18. A system according to claim 17, further comprising means for identifying the processor-controlled machine at which a user is located in accordance with the identity of the user's DECT telephone.

19. A system according to claim 17, further comprising means for selecting a speech recognition means to be used by the speech data processing means in accordance with the identity of the DECT telephone.

20. A system according to claim 1, wherein the accessing means is arranged to access a plurality of different speech recognition means and to use the results of speech recognition performed by each of the different speech recognition means to derive the recognised speech data.

21. A system according to claim 20, wherein at least some of the speech recognition means are provided by computers couplable to the network.

22. A system according to claim 1, wherein at least one of the spoken instruction interpreting apparatus and at least one of the processor-controlled machines is provided with the speech recognition means.

23. A system according to claim 1, wherein at least one of the spoken instruction interpreting apparatus and at least one of the processor-controlled machines comprises for identifying the speaker of the instructions and means for accessing speech recognition means trained to the voice of the speaker.

24. A system according to claim 1, wherein;
the accessing means is arranged to access a grammar store associating each of a number of voice macros or spoken words or phrases with a series of functions to be carried out at a first machine.

25. A system according to claim 1, wherein the plurality of processor-controlled machines comprises a plurality of first machines, a second machine,
and means for transmitting the speech data to the second machine, the second machine having the spoken instruction interpreting apparatus for interpreting spoken instructions received by the receiving means and for transmitting commands over the network to one of the plurality of first machines, at least that first machine having means for receiving control commands over the network from the second machine, and at least that first machine having the determining means for determining whether that first machine can process the received commands and the advising means for advising the user of another machine on the network that can process the received commands if the determining means determines that that first machine cannot.

26. A system according to claim 1, comprising a shared grammar which defines words that can be used in spoken instructions in relation to any machine of a particular type.

27. A system according to claim 26, wherein the determining means is arranged to use the shared grammar to determine if a processor-controlled machine can carry out an identified function.

28. A system according to claim 1, comprising a start up grammar, means for identifying a processor-controlled machine type on the basis of speech recognized using the start up grammar, and means for selecting a grammar which defines words that can be used in spoken instructions in relation to the identified processor-controlled machine type.

29. A system according claim 1, wherein a processor-controlled machine comprises a manually operable user interface for receiving manually input commands for causing the machine to carry out a function, the processor-controlled machine being operable to carry out a function in accordance with manually input commands, spoken commands or a combination of manually input and spoken commands.

30. A system according to claim 1, further comprising means for compressing speech data for transmission by the transmitting means.

31. A system comprising:
a speech server couplable to a network;
an instruction originating processor-controlled machine couplable to the network;
means for receiving speech data representing instructions spoken by a user and specifying a function to be carried out;
means for transmitting speech data to the speech server; and
an instruction receiving processor-controlled machine couplable to the network having means for receiving control commands over the network and means for causing the instruction receiving machine to act in accordance with the control commands, the speech server comprising a spoken instruction interpreting apparatus having processor-controlled machine identifying means for identifying the one of the plurality of processor-controlled machines that the user wishes to control, accessing means for accessing speech recognition means to cause the speech recognition means to perform speech recognition processing on speech data received by the speech data receiving means to produce recognised speech data, processing means for processing recognised speech data received from the speech recognition means to derive from the recognised speech data control command data for controlling the identified processor-controlled machine, and control command data transmitting means for transmitting the derived control command data over the network to the identified processor-controlled machine to enable the function actioning means of the identified processor-controlled machine to cause the function specified by the user's spoken instruction to be carried out, the system further comprising:

look-up means for storing information relating to the functions capable of being carried out by processor-controlled machines coupled to the network;

determining means for determining whether the identified processor-controlled machine can carry out the function specified in a spoken instruction; and advising means for advising the user, on the basis of the information stored in the look-up means, if there is another processor-controlled machine coupled to the network that can carry out the function specified in a spoken instruction if the determining means determines that the identified processor-controlled machine cannot carry out the function.

32. A system according to claim 31, wherein the instruction originating processor-controlled machine is a digital camera or computer and the instruction receiving processor-controlled machine is a printer.

33. A system according to claim 32, wherein the look-up means comprises a JINI look-up service containing a directory of printers comprising Java virtual machines connected to the network and identifying the functions that can be carried out by those printers, and the spoken instruction interpreting apparatus comprises a Java virtual machine and is operable to download a JINU service object associated with the printer to the instruction originating processor-controlled machine in response to receipt of such a request and to send to the JINI service object commands for causing the printer to carry out a printing function in response to speech data received from the user, the JINI service object providing the determining means for determining whether the printer can carry out the requested printing function and, if so, for communicating with the printer over the network to cause the printer to carry out the requested printing function.

34. An apparatus for interpreting spoken instructions for use in a network system to which processor-controlled machines are coupled, the apparatus comprising:

accessing means for accessing speech recognition means for performing speech recognition to produce recognised speech data on received speech data representing spoken instructions;

processing means for processing recognised speech data to derive from the recognised speech data commands for causing a machine coupled to the network to carry out a function specified by the spoken instructions;

processor-controlled machine identifying means for identifying the one of the plurality of processor-controlled machines that the user wishes to control;

control command data transmitting means for transmitting the derived control command data over the network to the identified processor-controlled machine to enable the identified processor-controlled machine to carry out the function specified by the user's spoken instruction;

look-up means for storing information relating to the functions that processor-controlled machines coupled to the network are capable of carrying out;

determining means for determining whether the identified processor-controlled machine can carry out the function specified in a spoken instruction; and advising means for advising the user, on the basis of the information stored in the look-up means, if there is another processor-controlled machine coupled to the network that can carry out the function specified in a spoken instruction if the determining means determines that the identified processor-controlled machine cannot carry out the function.

35. Apparatus according to claim 34, comprising a grammar store which defines at least one of words and phrases that can be used in spoken instructions.

36. Apparatus according to claim 33, wherein the grammar store stores a respective grammar for each of a plurality of different functions that can be carried out by machines coupled to the network.

37. Apparatus according to claim 36, wherein the grammar store stores a shared grammar containing words common to instructions relating to the different functions.

38. Apparatus according to claims 36, wherein the grammar store stores copy, fax and print grammars.

39. Apparatus according to claim 34, comprising a grammar store storing rules determining the structure of phrases that can be used in spoken instructions.

40. Apparatus according to claim 34, having a grammar store storing rules determining the structure of phrases that can be used in spoken instructions and a vocabulary of words that can be used in those phrases.

41. Apparatus according to claim 34, having means for communicating with a telephone system to receive speech data.

42. Apparatus according to claim 34, wherein the accessing means is arranged to access a plurality of different speech recognition means and to use the results of speech recognition performed by each of the different speech recognition means to derive the recognised speech data.

43. Apparatus according to claim 34, provided with the speech recognition means.

44. Apparatus according to claim 34, further comprising means for identifying the speaker of the instructions and means for accessing speech recognition means trained to the voice of the speaker.

45. A signal carrying processor implementable instructions for causing processing means to be configured to provide an apparatus as claimed in claim 34.

46. Apparatus according to claim 34, wherein the look-up means is a JINI look-up service.

47. A machine for carrying out at least one function, comprising:

means for coupling the machine to a network;

means for receiving speech data representing spoken instructions specifying a function to be carried out by the machine;

means for supplying the speech data to speech processing means coupled to the network;

means for receiving from the network control commands derived from the speech data supplied to the speech processing means;

means responsive to the control commands for causing the function specified by the spoken instructions to be carried out means for determining whether the function specified by the spoken instructions can be carried out; and means for advising the user if the function cannot be carried out, wherein the advising means comprises means for accessing a look-up store containing information relating to the functions that can be carried out by machines coupled to the network and means for advising the user of any other machine that can carry out the requested function.

48. A machine according to claim 47, wherein the machine has a photocopying function.

49. A machine according to claim 47, wherein the machine has a facsimile function.

50. A machine according to claim 47, wherein the advising means comprise means for causing a message to be displayed on a display of the machine.

51. A digital camera comprising:

means for coupling the camera to a network;

means for receiving speech data representing spoken instructions specifying a print function to be carried out by a printer coupled to the network;

means for supplying the speech data to speech processing means coupled to the network;

means for receiving from the network control commands derived from the speech data supplied to the speech processing means;

means responsive to control commands received from the network for supplying the control commands together with the data to be printed over the network to the printer for causing the print function specified by the spoken instructions to be carried out by the printer;

means for determining whether the function specified by the spoken instructions can be carried out by the printer; and means for advising the user if the function cannot be carried out by the printer, wherein the advising means comprises means for accessing a look-up store containing information relating to the functions that can be carried out by the printers coupled to the network and means for advising the user of any other printers that can carry out the specified function.

52. A device for controlling a machine for carrying out at least one function, comprising:

means for coupling the machine to a network;

means for receiving speech data representing spoken instructions specifying a function to be carried out by the machine;

means for supplying the speech data to speech processing means coupled to the network;

means for receiving from the network control commands derived from the speech data supplied to the speech processing means;

means responsive to the control commands for supplying to the machine commands for causing the function specified by the spoken instructions to be carried out;

means for determining whether the function specified by the spoken instructions can be carried out; and means for advising the user if the function cannot be carried out, wherein the advising means comprises means for accessing a look-up store containing information relating to the functions that can be carried out by machines coupled to the network and means for advising the user of any other machine that can carry out the requested function.

53. A device according to claim 52, operable to control a photocopying machine.

54. A device according to claim 52, operable to control a facsimile machine.

55. A device according to claim 52, operable to control a digital camera, wherein the means for receiving speech data is operable to receive spoken instructions specifying a print function to be carried out by a printer coupled to the network, and, wherein the means responsive to control commands received from the network is operable to supply the control commands together with the data to be printed over the network to the printer for causing the print function specified by the spoken instructions to be carried out by the printer.

56. A device according to claim 52, wherein the advising means comprise means for causing a message to be displayed on a display of the machine.

57. A method of controlling operation of a machine coupled to a network, comprising:

receiving speech data representing spoken instructions for controlling the machine;

performing speech recognition on the received speech data to produce recognized speech data;

processing the recognized speech data to derive from the recognized speech data commands for causing the machine to carry out a function specified by the spoken instructions;

determining whether the function specified by the spoken instructions can be carried out; and in the event the function cannot be carried out, accessing a look-up store containing information relating to the functions that can be carried out by machines coupled to the network and then advising the user of any other machine that can carry out the requested function.

58. A method according to claim 57, which comprises using a grammar store which defines at least one of words and phrases that can be used in spoken instructions to perform said speech recognition.

59. A method according to claim 57, which comprises using a grammar store storing rules determining the structure of phrases that can be used in spoken instructions to perform said speech recognition.

60. A method according to claim 57, which comprises using a grammar store storing rules determining the structure of phrases that can be used in spoken instructions and a vocabulary of words that can be used in those phrases to perform said speech recognition.

61. A method according to claim 57, which comprises using a grammar store storing a respective grammar for each of a plurality of different functions that can be carried out by processor-controlled machines coupled to the network.

62. A method according to claim 61, which comprises using as said grammar store a grammar store storing a shared grammar containing words common to instructions relating to the different functions.

63. A method according to claim 61, which comprises using a grammar store storing copy, fax and print grammars.

64. A method according to claim 57, which comprises receiving speech data over a telephone system.

65. A method according to claim 57, which comprises performing speech recognition using a plurality of different speech recognition means and deriving the recognised speech data using the results of speech recognition performed by each of the different speech recognition means.

66. A method according to claim 57, further comprising identifying the speaker of the instructions and accessing speech recognition means trained to the voice of the speaker to perform the speech recognition.

67. A signal carrying processor implementable instructions for causing processing means to carry out a method as claimed in claim 57.

68. A method of operating a machine, comprising:
receiving speech data representing spoken instructions specifying a function to be carried out by the machine;
supplying the speech data to a network;
receiving from the network control commands derived from the speech data supplied to the network for causing the function specified by the spoken instruction to be carried out;
determining whether the function specified by the spoken instructions can be carried out; and
in the event the function cannot be carried out, accessing a look-up store containing information relating to the functions that can be carried out by machines coupled to the network and then advising the user of any other machine that can carry out the requested function.

69. A method according to claim 68, which comprises advising the user by causing a message to be displayed on a display of the machine.

70. A storage medium carrying processor implementable instructions for causing processing means to carry out a method as claimed in claim 68.

71. An apparatus for interpreting spoken instructions for use in a network system to which processor-controlled machines are coupled, the apparatus comprising:
an accessor operable to access a speech recognizer that performs speech recognition to produce recognised speech data based on received speech data representing spoken instructions;
a processor operable to process recognised speech data to derive from the recognised speech data commands for causing a machine coupled to the network to carry out a function specified by the spoken instructions;
a processor-controlled machine identifier operable to identify the one of the plurality of processor-controlled machines that the user wishes to control;
a control command data transmitter operable to transmit the derived control command data over the network to the identified processor-controlled machine to enable the identified processor-controlled machine to carry out a function;
a look-up store storing information relating to the functions that processor-controlled machines coupled to the network are capable of carrying out;
a determiner operable to determine whether the identified processor-controlled machine can carry out the function specified in a spoken instruction; and
an advisor operable to advise the user, on the basis of the information stored in the look-up store, if there is another processor-controlled machine coupled to the network that can carry out the function specified in a spoken instruction if the determiner determines that the identified processor-controlled machine cannot carry out the function.

* * * * *

UNITED STATES PATENT AND TRADEMARK OFFICE
CERTIFICATE OF CORRECTION

PATENT NO. : 6,975,993 B1
APPLICATION NO. : 09/562932
DATED : December 13, 2005
INVENTOR(S) : Robert Alexander Keiller It is certified that error appears in the above-identified patent and that said Letters Patent is hereby corrected as shown below:

Title Page;
IN THE DRAWINGS
Sheet 15, Fig. 18, "THAST" should read --THAT--.

COLUMN 1
Line 7, "together, in" should read --together. In--.
Line 35, "the" should read --the operation or functioning of a machine connected to the--.

COLUMN 18
Line 14, "for the or" should read --for--.

COLUMN 22
Line 33, "and" should read --so--.

COLUMN 25
Line 44, "platform then" should read --platform, then--.

COLUMN 27
Line 28, "machines" should read --machine,--.

COLUMN 28
Line 7, "for" should read --means for--.

UNITED STATES PATENT AND TRADEMARK OFFICE
CERTIFICATE OF CORRECTION

PATENT NO. : 6,975,993 B1
APPLICATION NO. : 09/562932
DATED : December 13, 2005
INVENTOR(S) : Robert Alexander Keiller It is certified that error appears in the above-identified patent and that said Letters Patent is hereby corrected as shown below:

COLUMN 30
Line 29, "claim 33," should read --claim35,--.
Line 36, "claims 36," should read --claim 36,--.

Signed and Sealed this

First Day of January, 2008

JON W. DUDAS
*Director of the United States Patent and Trademark Office*